(12) United States Patent
Ausman et al.

(10) Patent No.: US 10,278,363 B2
(45) Date of Patent: *May 7, 2019

(54) METHOD AND SYSTEM FOR PROVIDING CONTROLLED FOOD PORTIONS TO AN ANIMAL AND ASSESSING THE ANIMAL'S HEALTH

(71) Applicant: LIONESS FEEDING TECHNOLOGY INC., Fergus (CA)

(72) Inventors: Brian Ausman, Fergus (CA); Christine Stec, Fergus (CA)

(73) Assignee: LIONESS FEEDING TECHNOLOGY INC., Fergus, Ontario (CA)

( * ) Notice: Subject to any disclaimer, the term of this patent is extended or adjusted under 35 U.S.C. 154(b) by 148 days.

This patent is subject to a terminal disclaimer.

(21) Appl. No.: 15/183,738

(22) Filed: Jun. 15, 2016

(65) Prior Publication Data

US 2017/0223926 A1 Aug. 10, 2017

Related U.S. Application Data

(63) Continuation-in-part of application No. 15/017,557, filed on Feb. 5, 2016, now Pat. No. 9,795,115.

(51) Int. Cl.
| | |
|---|---|
| *A01K 5/00* | (2006.01) |
| *A01K 5/02* | (2006.01) |
| *A01K 11/00* | (2006.01) |
| *A01K 29/00* | (2006.01) |

(52) U.S. Cl.
CPC .......... *A01K 5/0283* (2013.01); *A01K 5/0233* (2013.01); *A01K 11/006* (2013.01); *A01K 29/005* (2013.01)

(58) Field of Classification Search
CPC .. A01K 11/006; A01K 29/005; A01K 5/0283; A01K 5/0233; A01K 5/0241; A01K 5/0291; A01K 5/0114; A01K 5/0225; A01K 5/0275
USPC ......... 119/53, 51.01, 57.92, 52.1, 52.4, 53.5, 119/54, 56.1, 57.1
See application file for complete search history.

(56) References Cited

U.S. PATENT DOCUMENTS

| | | | | |
|---|---|---|---|---|
| 3,382,847 | A * | 5/1968 | Clarke | A01K 5/0275 |
| | | | | 119/51.11 |
| 3,827,404 | A * | 8/1974 | North | A01K 5/0291 |
| | | | | 119/51.11 |
| 3,904,082 | A * | 9/1975 | Hostetler | A01K 5/0283 |
| | | | | 119/51.11 |

(Continued)

*Primary Examiner* — Yvonne R Abbott-Lewis
(74) *Attorney, Agent, or Firm* — Aird & McBurney LP

(57) ABSTRACT

A feeding station for at least one animal, said feeding station comprising at least one supply hopper having a food product; a food dispensing unit having means for dispensing controlled portions of said food product; a weigh hopper for receiving said food product from said food dispensing unit; a hemi-circular disc-shaped feeding platform for receiving said food product from said weigh hopper; and a hemi-frustoconical sweeping member comprises at least one compartment to contain said food product on hemi-circular disc-shaped feeding platform; said hemi-frustoconical sweeping member rotatable on a top surface of said hemi-circular disc-shaped feeding platform to remove unconsumed food product off said feeding platform after a feeding event.

24 Claims, 19 Drawing Sheets

(56) References Cited

U.S. PATENT DOCUMENTS

| | | | | |
|---|---|---|---|---|
| 4,235,200 A | * | 11/1980 | Shay | A01K 5/0233 119/51.11 |
| 5,435,267 A | * | 7/1995 | Patterson | A01K 5/0241 119/52.4 |
| 6,199,511 B1 | * | 3/2001 | Thibault | A01K 5/0241 119/53 |
| 7,681,527 B2 | * | 3/2010 | Pratt | A01K 29/00 119/174 |
| 7,891,317 B2 | * | 2/2011 | Bodenstab | A01K 5/0225 119/51.01 |
| 8,656,862 B2 | * | 2/2014 | Manickchan | A01K 5/0275 119/51.01 |
| 8,997,690 B2 | * | 4/2015 | Jones | A01K 7/02 119/51.5 |
| 2017/0196196 A1 | * | 7/2017 | Trottier | A01K 5/0283 |

* cited by examiner

METHOD AND SYSTEM FOR PROVIDING CONTROLLED FOOD PORTIONS TO AN ANIMAL AND ASSESSING THE ANIMAL'S HEALTH

CROSS-REFERENCE TO RELATED APPLICATIONS

This application is a continuation-in-part of Non-Provisional application Ser. No. 15/017,557 filed on Feb. 5, 2016.

FIELD OF THE INVENTION

The present invention relates to an automated method and system for feeding animals, more specifically it relates to providing controlled portions of food to a uniquely identified animal in a predetermined time period, and in accordance with the animal's dietary restrictions.

DESCRIPTION OF THE RELATED ART

In a recent survey it was reported that 62% of Americans have a pet, with the dog population estimated at 71 million, and the cat population estimated at 73 million. A multitude of reasons have been postulated to explain the rise in pet ownership over the years, and whatever the particular reason, there is now conclusive evidence that pets contribute to the physical and psychological well-being of their owners.

Household pets are typically feed at least three times a day, and so it is no surprise that more than 8.3 million tons of cat and dog food (wet, dry, treats and mixers) were sold in the United States in 2013, which amounts to about $20 billion in sales. There are several types of feeding methods employed by most pet owners, such as free-choice feeding, also known as "ad lib" feeding or "free feeding", in which food is available at all times, such that the pet can eat as much and whenever it desires. This approach is used for most nursing pets, and is most appropriate when feeding dry food, which will not spoil if left out. However, with this approach some pets are prone to overeating as they lack self-regulation, and therefore this approach often leads to obesity. Another method is portion-control feeding which entails measuring the pet's food in order to control the amount of food that can be consumed. With this feeding method food can be provided in one or more meals daily, and this method is typically used for weight control programs and for animals that might overeat if they are on free-choice feeding. Yet another approach is the timed feeding method, which involves making a portion of food available for consumption for a specified period of time, after which any food that is not consumed is removed.

These approaches are generally considered to be inconvenient and a chore by most pet owners, as they require pet owners to measure feed amounts themselves, and schedule feeding times; and in some cases the pet owners are forced to be physically present to perform the feeding duties. In addition, most pets are often alone at home for extended times, such as during work hours or vacations, and therefore sufficient food and water must be left in an accessible location for the pets to consume. Alternatively, the pet owner is tasked to enlist another person to perform the feeding duties.

In households with multiple pets, or a mix of pets such as cats and dogs, feeding can be especially challenging since dogs and cats each have special dietary needs and should be fed the appropriate pet food. Generally, pet food is designed to be species-specific, and it is not appropriate for a cat to eat dog foo, as dog food may not provide all the essential nutrients a healthy cat needs, and vice-versa. In addition, some pets might consume more food or water than others, thus depriving others of food or water. Such inequitable distribution of food and water may lead to health issues, and some pets may become obese, while others may be malnourished or underweight. To further exacerbate the problem, some pets may be on strict or special diet that dictates consumption of specific amounts of food at predetermined times, such as diets to counter obesity, diabetes, or urinary conditions. As these dietary needs are usually unique to each pet, it can be very challenging, if not impossible, to maintain each pet on a specific feeding regimen, or schedule, and if separate diets are introduced, it can be nearly impossible.

Several systems for automatically feeding animals have been proposed, however these prior art systems do not adequately address the above-noted issues associated with feeding animals.

It is an object of the present invention to mitigate or obviate at least one of the above-mentioned disadvantages.

SUMMARY OF THE INVENTION

In one of its aspects, there is provided a feeding station for at least one animal, said feeding station comprising:
an enclosure having a base, said enclosure comprising:
a first supply hopper having a first food product;
a second supply hopper having a second food product;
a portal to said enclosure for allowing access to said first food product and said second food product by said at least one animal for a feeding event;
a first food dispensing unit having means for dispensing controlled portions of said first food product;
a second food dispensing unit having means for dispensing controlled portions of said second food product;
a weigh hopper having a first section for receiving said first food product from said first food dispensing unit; and a second section for receiving said second food product from said second food dispensing unit;
a feeding platform within said enclosure for receiving said food product from said weigh hopper, and a feeding platform sweeping member comprising a first compartment to receive said first food product and a second compartment to receive said second food product; and whereby feeding platform sweeping member is caused to clear unconsumed said first food product and unconsumed second food product off said feeding platform;
a first disposal bin for receiving said unconsumed first food product from said feeding platform, and a second disposal bin for receiving said unconsumed second food product from said feeding platform following said feeding event; and
at least one weight sensor for determining the weight of said first food product in said first section of said weigh hopper before said feeding event, and the weight of said second food product in said second section of said weigh hopper before said feeding event, and for determining the weight of said first food product in said first disposal bin and the weight of said second food product in said second disposal bin following said feeding event.

In another of its aspects, there is provided a method for dispensing at least one food product for at least one animal in a feeding station enclosure, said method comprising the steps of:
associating said at least one animal with an identification tag having a unique identifier, and associating said unique identifier with a feeding program;

storing said unique identifier and said feeding program in a database structure;

detecting the presence of said at least one animal in the vicinity of a portal of said enclosure, and acquiring said unique identifier information;

querying said database structure with said unique identifier and retrieving said feeding program associated with said at least one animal;

providing a control signal to at least one dispensing unit to dispense a specific amount of said at least one food product to a weigh hopper, in accordance with said feeding program;

weighing said at least one food product in said weight hopper and releasing said at least one food product to a feeding platform for said at least one animal to initiate a feeding event, said feeding platform associated with at least one compartment to receive said at least one food product; and recording a pre-feeding event weight measurement of said at least one food product;

sensing the non-presence of said at least one animal within said enclosure, indicative of an end to said feeding event;

removing unconsumed at least one food product off said feeding platform into at least one disposal bin, weighing said unconsumed at least one food product and recording a post-feeding event weight measurement of said at least one food product; and determining the amount of at least one food product consumed by said at least one animal based on said pre-feeding event weight measurement of said at least one food product and said post-feeding event weight measurement of said at least one food product.

In another of its aspects, there is provided a feeding station for at least one animal, said feeding station comprising:

an enclosure having a base, said enclosure comprising:
at least one supply hopper having a food product;
a food dispensing unit having means for dispensing controlled portions of said food product;
a weigh hopper for receiving said food product from said food dispensing unit;
a hemi-circular disc-shaped feeding platform within said enclosure for receiving said food product from said weigh hopper;
a portal to said enclosure for allowing access to said food product by said at least one animal for a feeding event;
a hemi-frustoconical sweeping member rotatable on a top surface of said hemi-circular disc-shaped feeding platform, and disposed on said hemi-circular disc-shaped feeding platform before said food product is released from said weigh hopper prior to said feeding event; and wherein said hemi-frustoconical sweeping member comprises at least one compartment to contain said food product;
and said hemi-frustoconical sweeping member rotatable to remove unconsumed food product off said feeding platform after said feeding event;
at least one disposal bin for receiving said unconsumed food product from said feeding platform following said feeding event; and
at least one weight sensor for determining the weight of said food product in said weigh hopper before said feeding event, and for determining the weight of said food product in said at least one disposal bin following said feeding event.

In another of its aspects, there is provided a feeding station for at least one animal, said feeding station comprising:

at least one supply hopper having a food product;
a food dispensing unit having means for dispensing controlled portions of said food product;
a weigh hopper for receiving said food product from said food dispensing unit;
a feeding platform for receiving said food product from said weigh hopper; and
a sweeping member comprising at least one compartment to contain said food product on said feeding platform; said sweeping member rotatable on a top surface of said feeding platform to remove unconsumed food product off said feeding platform after a feeding event.

In another of its aspects, there is provided a feeding station for at least one animal, said feeding station comprising:

an enclosure having a base, said enclosure comprising:
a plurality of supply hoppers, at least one of said plurality of supply hoppers having a food product;
a portal to said enclosure for allowing access to said food product by said at least one animal for a feeding event;
a plurality of food dispensing units having means for dispensing controlled portions of said food product from at least one of said plurality of supply hoppers;
at least one weigh hopper having a plurality of sections for receiving said food product from at least one of said plurality of food dispensing units;
a feeding platform within said enclosure for receiving said food product from said at least one weigh hopper, and a feeding platform sweeping member comprising a plurality of compartments to receive said food; and whereby feeding platform sweeping member is caused to clear unconsumed said food product off said feeding platform;
a plurality of disposal bins for receiving said unconsumed food product from said feeding platform following said feeding event; and
at least one weight sensor for determining the weight of said food product in at least one of said plurality of sections of said weigh hopper before said feeding event, and for determining the weight of said food product in at least one of said plurality of disposal bins following said feeding event.

In another of its aspects, there is provided a feeding station for at least one animal, said feeding station comprising:

an enclosure having a base, said enclosure having:
at least one supply hopper having a food product;
a food dispensing unit having means for dispensing controlled portions of said food product;
a weigh hopper for receiving said food product from said food dispensing unit;
a feeding platform within said enclosure for receiving said food product from said weigh hopper;
a portal to said enclosure for allowing access to said food product by said at least one animal for a feeding event;
a feeding platform sweeping member for clearing unconsumed food product off said feeding platform;
at least one disposal bin for receiving said unconsumed food product from said feeding platform following said feeding event; and
at least one weight sensor for determining the weight of said food product in said weigh hopper before said feeding event, and for determining the weight of said food product in said at least one disposal bin following said feeding event.

In another of its aspects, there is provided a method for dispensing at least one food product for at least one animal in a feeding station enclosure, said method comprising the steps of:

associating said at least one animal with an identification tag having a unique identifier, and associating said unique identifier with a feeding program;

storing said unique identifier and said feeding program in a database structure;

detecting the presence of said at least one animal in the vicinity of a portal of said enclosure, and acquiring said unique identifier;

querying said database structure with said unique identifier and retrieving said feeding program associated with said at least one animal;

providing a control signal to at least one dispensing unit to dispense a specific amount of said at least one food product to a weigh hopper, in accordance with said feeding program;

weighing said at least one food product in said weight hopper and releasing said at least one food product to a feeding platform for said at least one animal to initiate a feeding event; and recording a pre-feeding event weight measurement of said at least one food product;

sensing the non-presence of said at least one animal within said enclosure, indicative of an end to said feeding event;

removing unconsumed at least one food product off said feeding platform into at least one disposal bin, weighing said unconsumed at least one food product and recording a post-feeding event weight measurement of said at least one food product; and determining the amount of at least one food product consumed by said at least one animal based on said pre-feeding event weight measurement of said at least one food product and said post-feeding event weight measurement of said at least one food product.

In yet another of its aspects, there is provided a method for assessing the health of at least one animal, said method comprising the steps of:

associating said at least one animal with an identification tag having a unique identifier, and associating said unique identifier with a feeding program stored in a database structure;

determining whether said at least one animal is in the vicinity of a feeding platform based on an acquisition of said unique identifier by a tag reader, and providing a control signal to at least one dispensing unit to dispense a specific amount of at least one food product in accordance with said feeding program associated with said unique identifier, when said at least one animal is in the vicinity of said feeding platform and awaiting to initiate a feeding event;

weighing said at least one food product before releasing said at least one food product to said feeding platform and recording a pre-feeding event weight measurement of said at least one food product; weighing said at least one food product remaining on said feed platform following said feeding event, and recording a post-feeding event weight measurement of said at least one food product;

determining the amount of at least one food product consumed by said at least one animal based on said pre-feeding event weight measurement of said at least one food product and said post-feeding event weight measurement of said at least one food product; and determining the feeding habits of said at least one animal, said feeding habits including at least one of: type and amount of food consumed, and rate and frequency of consumption; time of day of feeding events, duration of feeding events.

In yet another of its aspects, there is provided a feeding station for at least one animal, said feeding station comprising:

an enclosure having a base, said enclosure having:

at least one supply hopper having a food product;

a food dispensing unit having means for dispensing controlled portions of said food product;

a weigh hopper for receiving said food product from said food dispensing unit;

a hemi-circular disc-shaped feeding platform within said enclosure for receiving said food product from said weigh hopper;

a portal to said enclosure for allowing access to said food product by said at least one animal for a feeding event;

a hemi-frustoconical sweeping member rotatable on a top surface of said hemi-circular disc-shaped feeding platform, and disposed on said hemi-circular disc-shaped feeding platform before said food product is released from said weigh hopper prior to said feeding event; and said hemi-frustoconical sweeping member rotatable to remove unconsumed food product off said feeding platform after said feeding event;

at least one disposal bin for receiving said unconsumed food product from said feeding platform following said feeding event; and at least one weight sensor for determining the weight of said food product in said weigh hopper before said feeding event, and for determining the weight of said food product in said at least one disposal bin following said feeding event.

In yet another of its aspects, there is provided a feeding station for at least one animal, said feeding station comprising:

an enclosure having a base, said enclosure comprising:

at least one supply hopper having a food product;

a food dispensing unit having means for dispensing controlled portions of said food product;

a weigh hopper for receiving said food product from said food dispensing unit;

a feeding platform within said enclosure for receiving said food product from said weigh hopper;

a portal to said enclosure for allowing access to said food product by said at least one animal for a feeding event;

a sweeping member rotatable on a top surface of said feeding platform, and disposed on said feeding platform before said food product is released from said weigh hopper prior to said feeding event; and wherein said sweeping member comprises at least one compartment to contain said food product;

and said sweeping member rotatable to remove unconsumed food product off said feeding platform after said feeding event;

at least one disposal bin for receiving said unconsumed food product from said feeding platform following said feeding event; and at least one weight sensor for determining the weight of said food product in said weigh hopper before said feeding event, and for determining the weight of said food product in said at least one disposal bin following said feeding event.

In yet another of its aspects, there is provided a feeding station for at least one animal, said feeding station comprising:

at least one supply hopper having a food product;

a food dispensing unit having means for dispensing controlled portions of said food product;

a weigh hopper for receiving said food product from said food dispensing unit;

a hemi-circular disc-shaped feeding platform for receiving said food product from said weigh hopper; and a hemi-frustoconical sweeping member rotatable on a top surface of said hemi-circular disc-shaped feeding platform to remove unconsumed food product off said feeding platform after a feeding event.

In yet another of its aspects, there is provided a feeding station for at least one animal, said feeding station comprising:

an enclosure having a base, said enclosure comprising:

a plurality of supply hoppers, at least one of said plurality of supply hoppers having a food product;

a portal to said enclosure for allowing access to said food product by said at least one animal for a feeding event;

a plurality of food dispensing units having means for dispensing controlled portions of said food product from at least one of said plurality of supply hoppers;

at least one weigh hopper having a plurality of sections for receiving said food product from at least one of said plurality of food dispensing units;

a feeding platform within said enclosure for receiving said food product from said at least one weigh hopper, and a feeding platform sweeping member comprising a plurality of compartments to receive said food; and whereby feeding platform sweeping member is caused to clear unconsumed said food product off said feeding platform;

a plurality of disposal bins for receiving said unconsumed food product from said feeding platform following said feeding event; and at least one weight sensor for determining the weight of said food product in at least one of said plurality of sections of said weigh hopper before said feeding event, and for determining the weight of said food product in at least one of said plurality of disposal bins following said feeding event.

In yet another of its aspects, there is provided a method and system for assessing the health of an animal by monitoring the animal's consumption levels of food, including weight, within predetermined time frames to form at least one dataset for determining the animal's health status, and regulating future consumption based on the health status.

In yet another of its aspects, there is provided a method and system for providing each animal with a fair share of the food in a multi-animal household or environment.

Advantageously, the claimed invention provides controlled portions of food only to uniquely identified animals within predetermined time periods, and keeps track of the animal's eating habits, by determining the type and amount of food consumed, and rate and frequency of consumption. Accordingly, automatic feeding of individual diets in multi-animal households is facilitated in a more convenient fashion, and thus has the potential to ease the schedules of busy animal owners. The claimed invention is also relatively cost effective as it substantially reduces the possibility of food wastage due to over-feeding, and also promotes observance of the dietary needs of the animals.

BRIEF DESCRIPTION OF THE DRAWINGS

Several exemplary embodiments of the present invention will now be described, by way of example only, with reference to the appended drawings in which.

DETAILED DESCRIPTION OF EXEMPLARY EMBODIMENTS

Figure 1A:
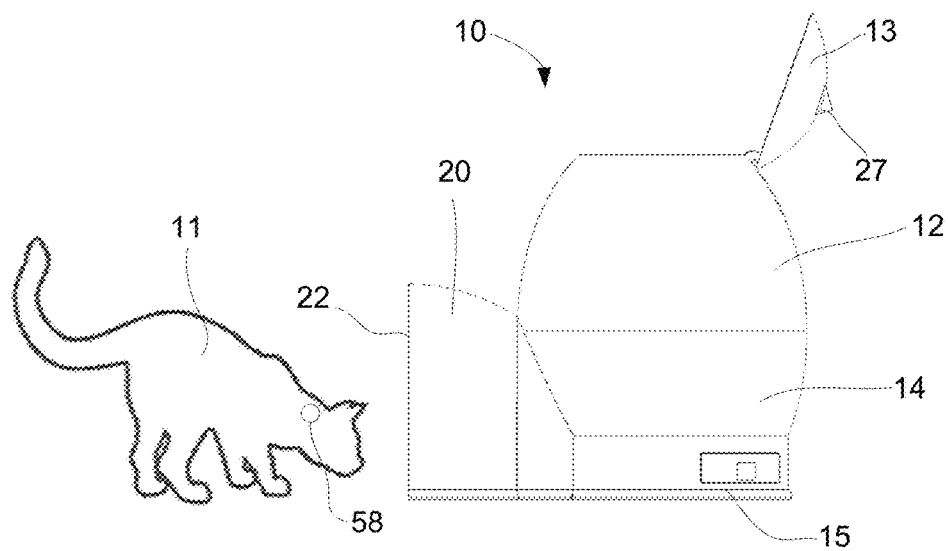
FIG. 1a is a side elevation view of a feeding station.
Figure 1B:
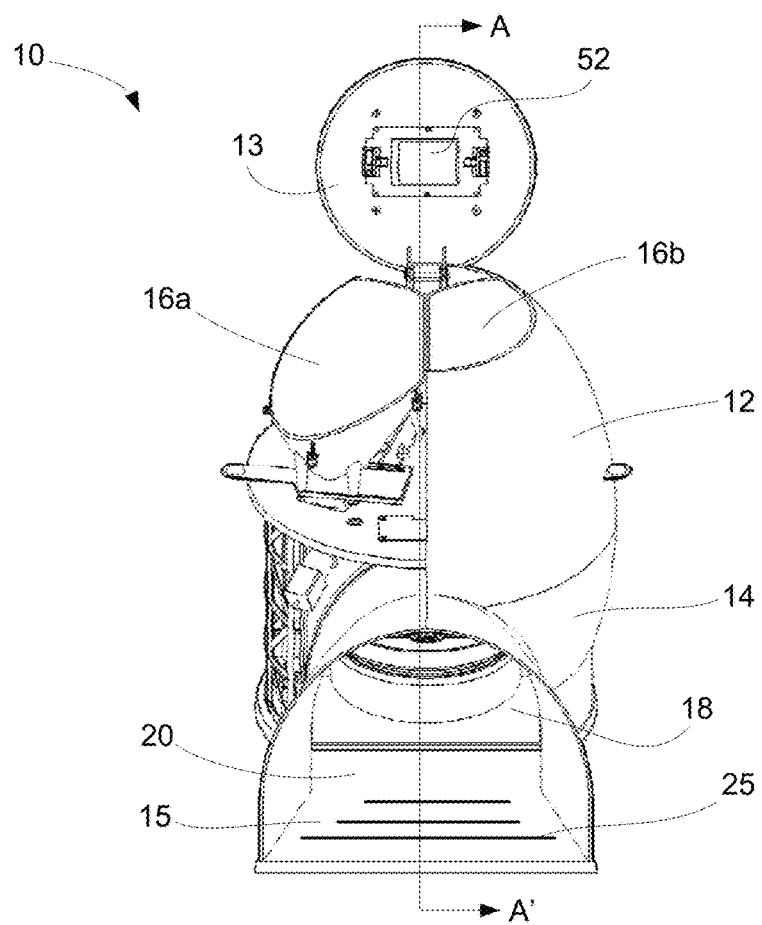
FIG. 1b shows a cut-away perspective view of the feeding station.

The detailed description of exemplary embodiments of the invention herein makes reference to the accompanying block diagrams and schematic diagrams, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

Moreover, it should be appreciated that the particular implementations shown and described herein are illustrative of the invention and are not intended to otherwise limit the scope of the claimed invention in any way. Indeed, for the sake of brevity, certain sub-components of the individual operating components, conventional data networking, application development and other functional aspects of the systems may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

Looking at FIGS. 1a, 1b, 1c, and 1d, there is shown a feeding station, generally designated by numeral 10, for providing controlled portions of food to animals, in one exemplary embodiment. Feeding station 10 is generally egg-shaped and comprises upper portion 12 with hinged lid 13 operable between a closed position and a closed position, lower portion 14, and base 15. Upper portion 12 comprises one or more supply hoppers 16a, 16b, for holding supplies of food product 17, which are dispensed to feeding chamber 18 formed within lower portion 14. Dispensed food product 17 is accessed by animal 11, via tunnel 20 having tunnel entrance 22 dimensioned to receive a portion of animal 11, such as head and neck. The egg-shaped nature of the upper portion 12 of the enclosure discourages animals 11, such as cats, from resting on top of it. Generally, a cat in that resting position may intimidate other cats from approaching feeding station 10, or may physically impede other cats from using feeding station 10.

Figure 1C:
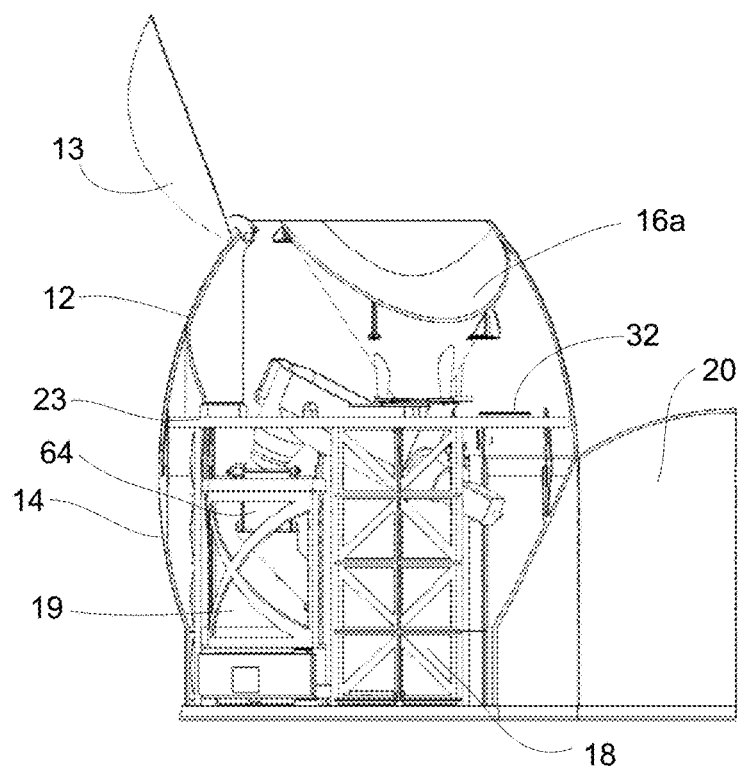
FIG. 1c shows a cut-away side view of the feeding station.
Figure 1D:
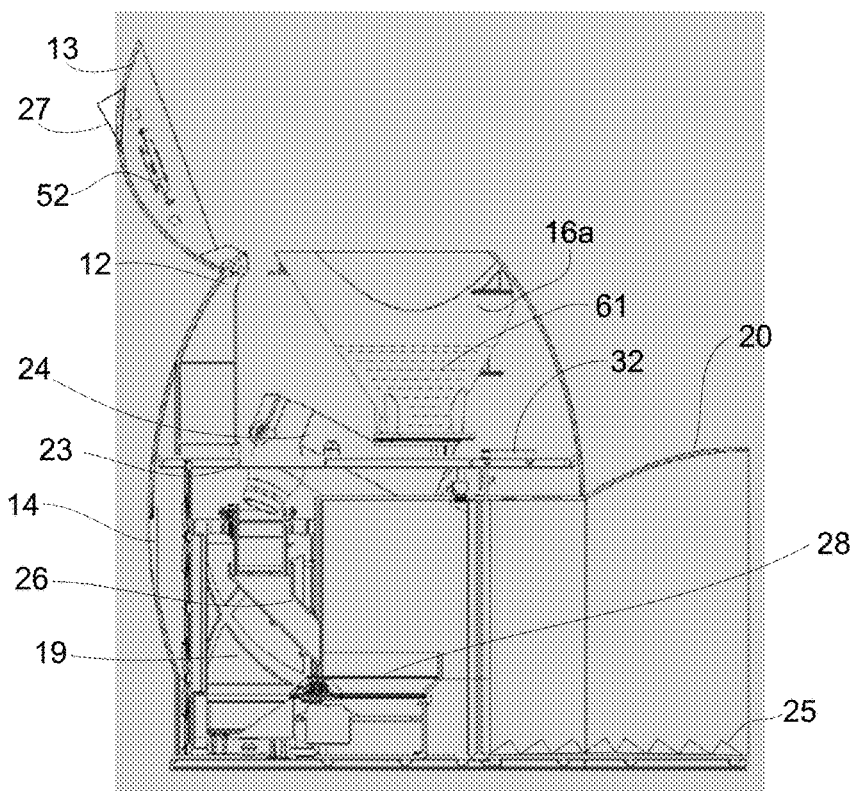
FIG. 1d shows a sectional view of the feeding station, taken along line A-A'.

As shown in FIG. 1d, intermediate upper portion 12 and lower portion 14 is dispensing platform 23 supporting food dispensing unit 24 operable to dispense controlled portions of food, such as dry food, or mixers and treats, to feeding chamber 18. The controlled food portions are weighed in weighing platform chamber 19, and subsequently delivered to feeding chamber 18 via a drop chute 26, to land on feeding platform 28.

Figure 2:
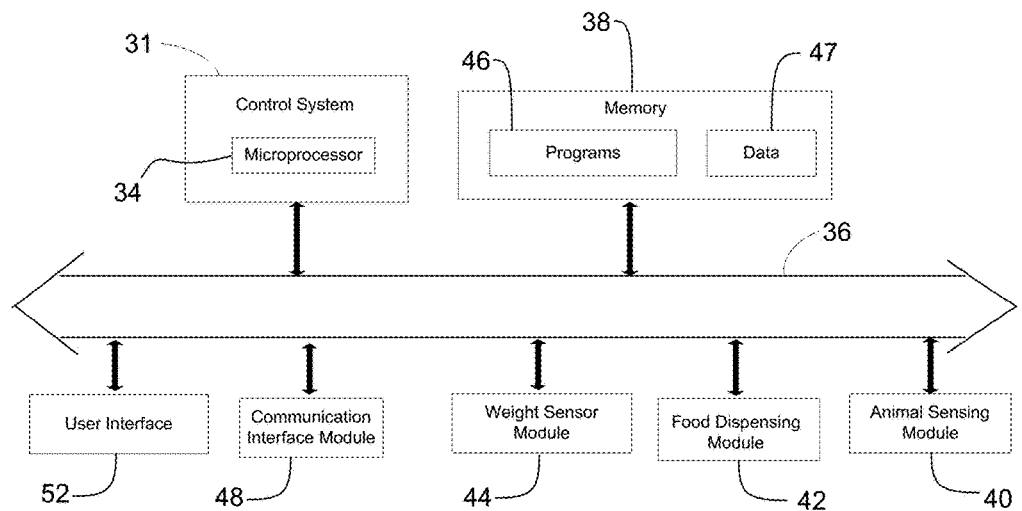
FIG. 2 is a top-level component architecture diagram of an exemplary feeding station.

Dispensing platform 23 also carries control system 31 on printed circuit board 32. Control system 31 comprises a general computing system having processing circuitry, such as, microprocessor 34, which is arranged to communicate, via system bus 36, with memory 38, animal sensing module 40, food dispensing module 42 is associated with food dispensing unit 24, and weight sensor module 44 receives input signals from load sensors, as shown in FIG. 2. The skilled person will appreciate that memory 38 may be provided by a variety of components including a volatile memory, a hard drive, a non-volatile memory, etc. Indeed, memory 38 comprises a plurality of components under the control of the, or otherwise connected to, microprocessor 34. However, typically memory 38 provides a program storage portion 46 arranged to store program code which when executed performs an action, such as feeding program or sensing program, and data storage portion 47 which can be used to store data either temporarily and/or permanently.

Figure 3:
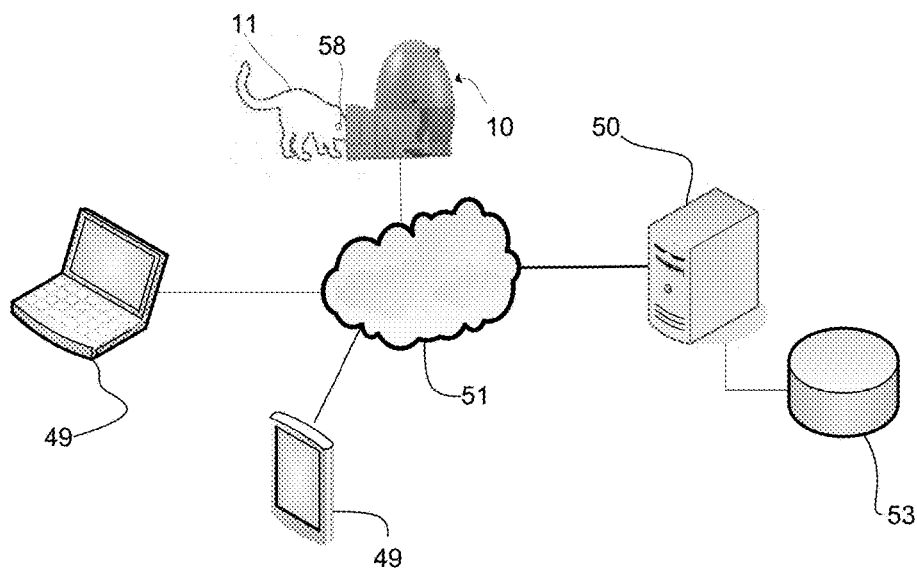
FIG. 3 is a block diagram of a feeding system.

Communications interface module 48 is also coupled to microprocessor 34, and may include a wired interface, wireless interface, optical interface, IR interface or RF interface, and may use standard protocols such as SONET, SDH, Zigbee, Ethernet, Wi-Fi (e.g. IEEE 802.11a/b/g/n, WiMax), Bluetooth, powerline communication (e.g. IEEE 1901), or other standard and non-standard physical layers well known to those skilled in the art. Accordingly, feed station 10 is associated with a unique identifier, such as a media access control (MAC) address. As shown in FIG. 3, communications interface module 48 enables connection to one or more computing devices 49, 50, and to shared or remote drives, via communications network 51. Computing devices 49, 50 may be in the form of any kind of general processing structure, and may for example include any device, such as, a personal computer, laptop, computer server, handheld user device (e.g. mobile phone, tablet, smartphone, smartwatch).

The programming of feeding station 10 may be performed via a user interface 52 coupled to microprocessor 34 executing an appropriate application program, or via computing devices 49, 50 with a suitable application program. Each animal 11 is associated with an animal profile comprising a unique identifier, dietary needs, feeding schedule to form a feeding program or regimen that is stored in database 53. In one example, a user may enter the desired number of meals for a particular animal 11 within a predetermined time period, and microprocessor 34 automatically calculates the correct amount of food to dispense for each meal, and/or determines the feeding schedule. Alternatively, a daily allotment of food may be set such that animal 11 may consume food product 17 at any time during the day provided the daily allotment is not exceeded. Exemplary user interface 52 is associated with lid 13 and comprises a display such as a liquid crystal display and may include button actuators, LEDs.

Figure 4:
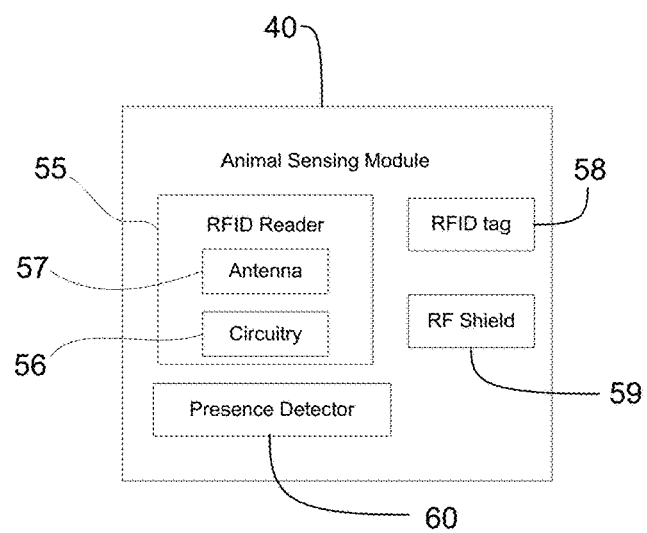
FIG. 4 is a top-level component schematic of an exemplary animal sensing module.

Looking at FIG. 4, animal sensing module 40 comprises radio frequency identification (RFID) reader assembly 55 with electronic circuitry 56 comprising a transceiver associated with a suitable antenna 57, and interrogates passive RFID tag 58 associated with animal 11 when animal 11 is positioned within feeding chamber 18, and within the read range of the antenna 57, or adjacent feeding platform 28. Each RFID tag 58 comprises a unique identifier corresponding to a particular animal 11, and RFID reader 55 recognizes the specific animal 11 via RFID tag 58. In turn, microprocessor 34 executes preprogrammed instructions associated with the feeding program to dispense a specific amount of food for a specific animal 11. Accordingly, all interactions between feeding station 10 and animal 11 may be logged, and therefore an exemplary audit log associated with a feeding event may include identification of animal 11, type of food product 17, manufacturer of food product 17, feeding time, feeding frequency, feeding rate, food weight, food consumption (based on dispensed amount measurement, unconsumed food measurement), and so forth. RF shield 59, such as a Faraday cage, formed by a conducting material or mesh blocks out external static electrical fields, such as radio waves, and prevents triggering of RFID reader 55 to interrogate RFID tags 58 external of feeding chamber 18. Accordingly, RFID reader 55 can act as a presence detector for animal 11, and therefore initiate the dispensation of food product 17 for animal 11 present in feeding chamber 18. Alternatively, presence detecting devices 60, such as proximity sensors, photoelectric detectors, or ultrasonic detectors, positioned adjacent the tunnel entrance 22 may be employed.

Food dispensing module 42 receives instructions from microprocessor 34 to dispense a specific type and amount of food product 17 corresponding to the uniquely-identified animal. The food supply may be replenished as needed by a user, and may include sensors for determining food levels in supply hoppers 16a, 16b, or amount of food remaining in order to issue alerts to a user based on the predetermined threshold levels, or advise the user of the remaining number of feeds remaining based on the feeding schedule and associated feeding portions.

Figure 5:
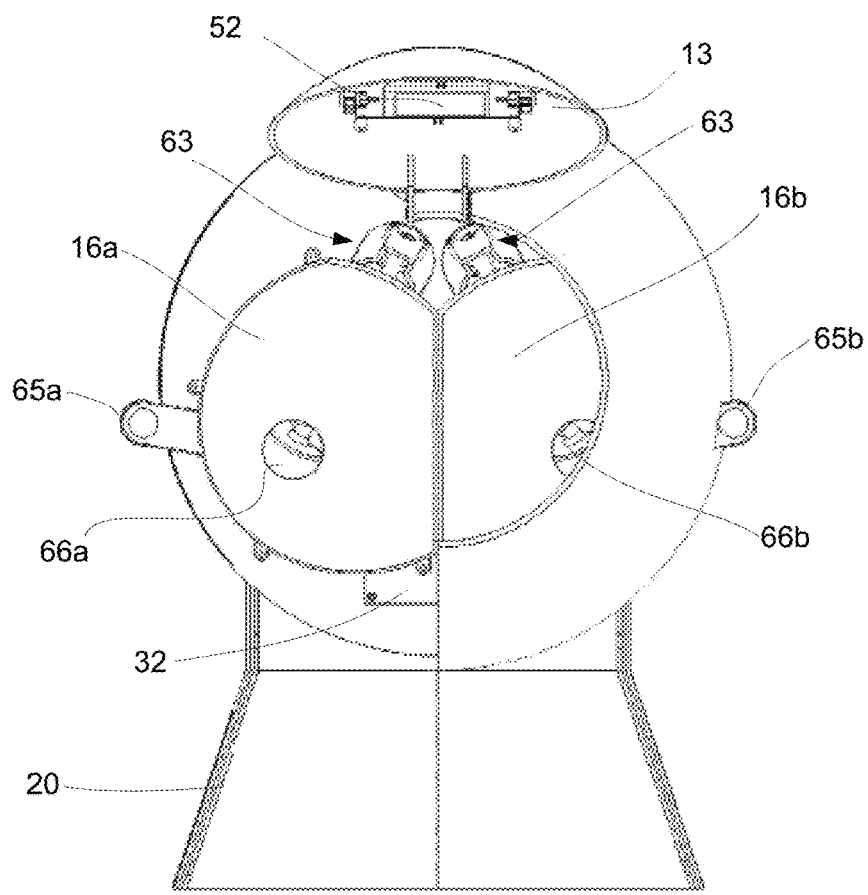
FIG. 5 is a cut-away top view of the feeding station.

As can be seen in FIGS. 1c and 5, food dispensing unit 24 comprises supply hoppers 16a, 16b for holding food product 17, troughs 62a, 62b comprising dispensing mechanism 63, and weigh hopper 64. Supply hoppers 16a, 16b may hold the same type of food product 17 or different types of food product 17, depending on the diet of animal 11, or user preferences. Therefore, one or more types of food products 17 are introduced into supply hoppers 16a, 16b via lid 13 when open, and food product 17 is discharged therefrom via retractable gate control 65a, 65b disposed between exit port 66a, 66b of each of supply hoppers 16a, 16b, and troughs 62a, 62b, respectively. Gate control 65a or 65b, is a longitudinally-extending plate with aperture 67 formed with the plate. Gate control 65a or 65b is resiliently-biased and slidable to place exit port 66a, 66b to maintain exit port 66a in a closed position. Gate control 65a or 65b is caused slides out away from a cover of upper portion 12, upon application of a force on gate control 65a or 65b away from the cover of upper portion 12, thereby positioning aperture 67 coaxially with exit port 66a or 66b to allow food product 17 to descend into troughs 62a, 62b. Removal of the force causes gate control 65a or 65b to slides back in to position aperture 67 non-coaxially with exit ports 66a, 66b to prevent food product 17 from flowing into troughs 62a, 62b. Gate control 65a, 65b are manually operated, or may be controlled by a solenoid.

Figure 6:
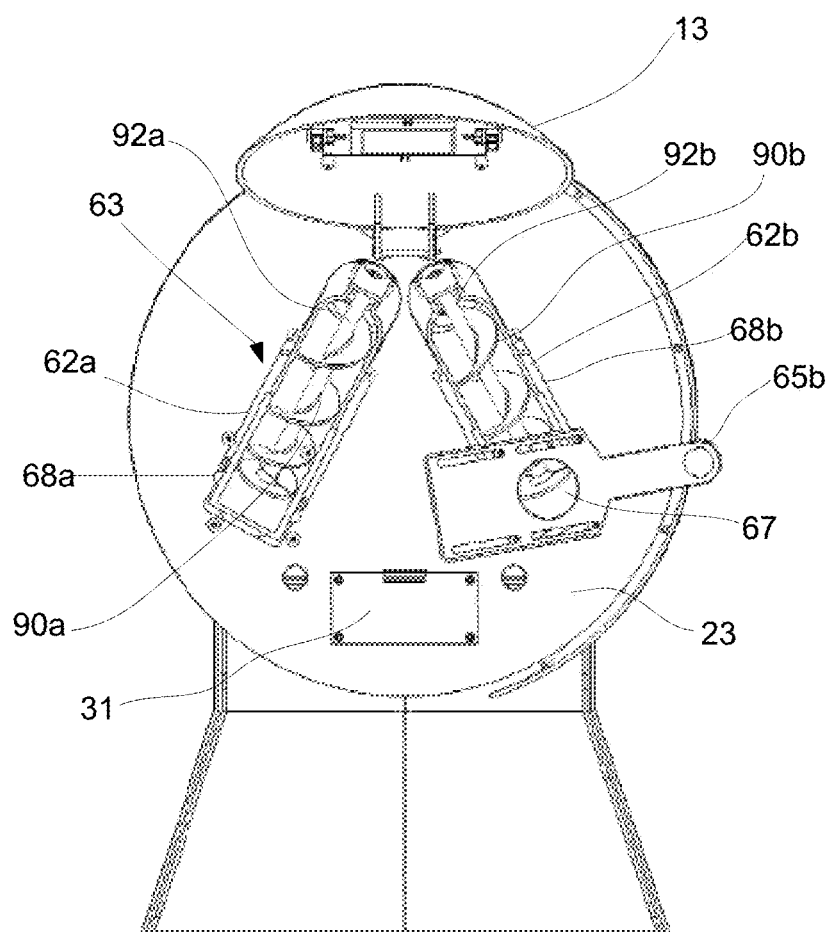
FIG. 6 is a top view of a dispensing mechanism for a food product.
Figure 7A:
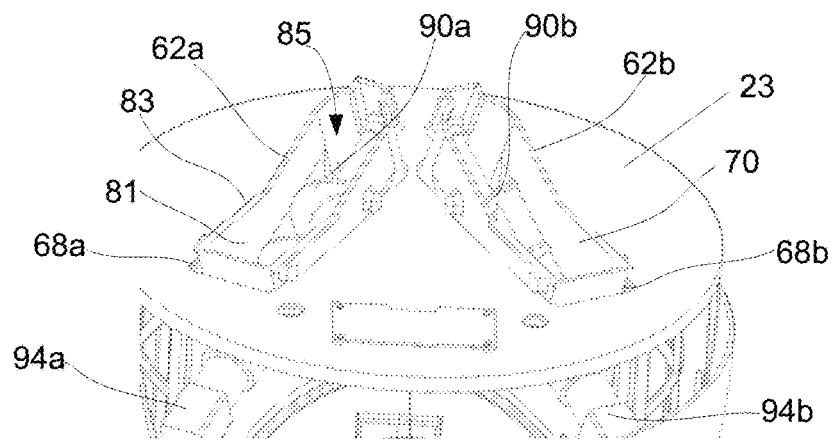
FIG. 7a is a top perspective view of the dispensing mechanism of FIG. 6.
Figure 7B:
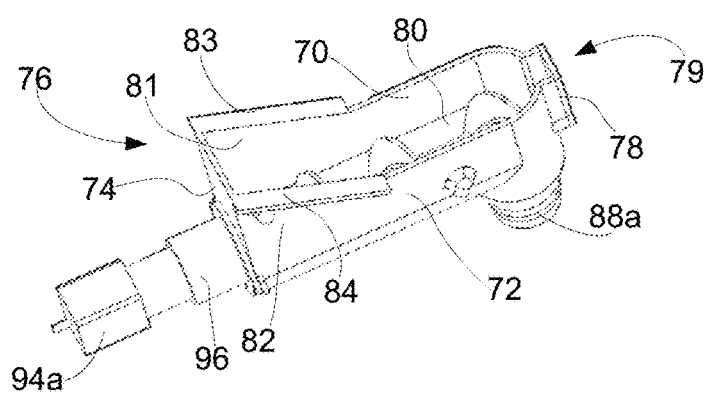
FIG. 7b is a perspective view of a trough with an auger of the dispensing mechanism.
Figure 7C:
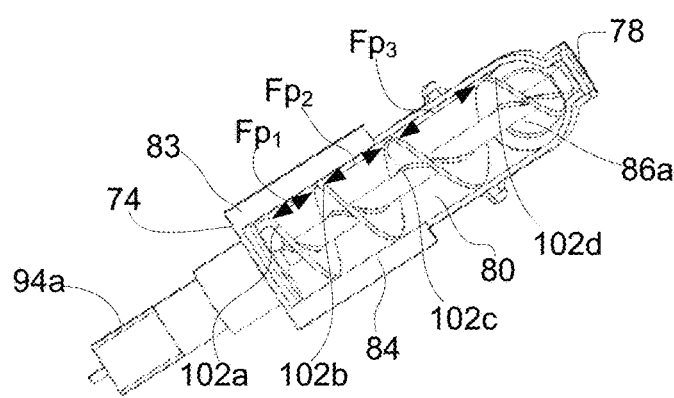
FIG. 7c is a top view of the trough with an auger of the dispensing mechanism.
Figure 7D:
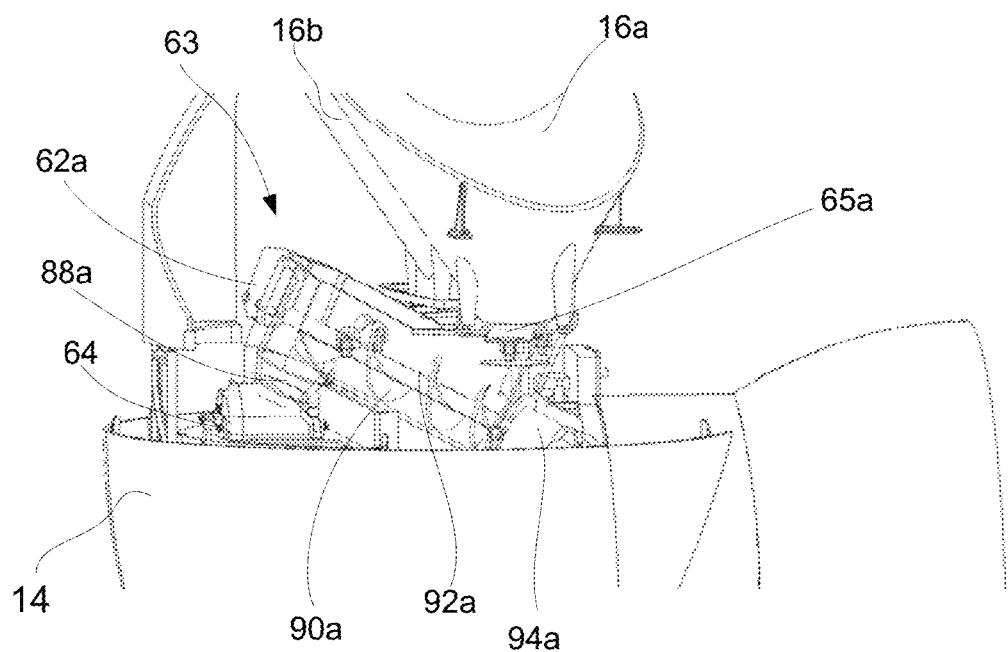
FIG. 7d is a cut through view of the trough with an auger of the dispensing mechanism.
Figure 8A:
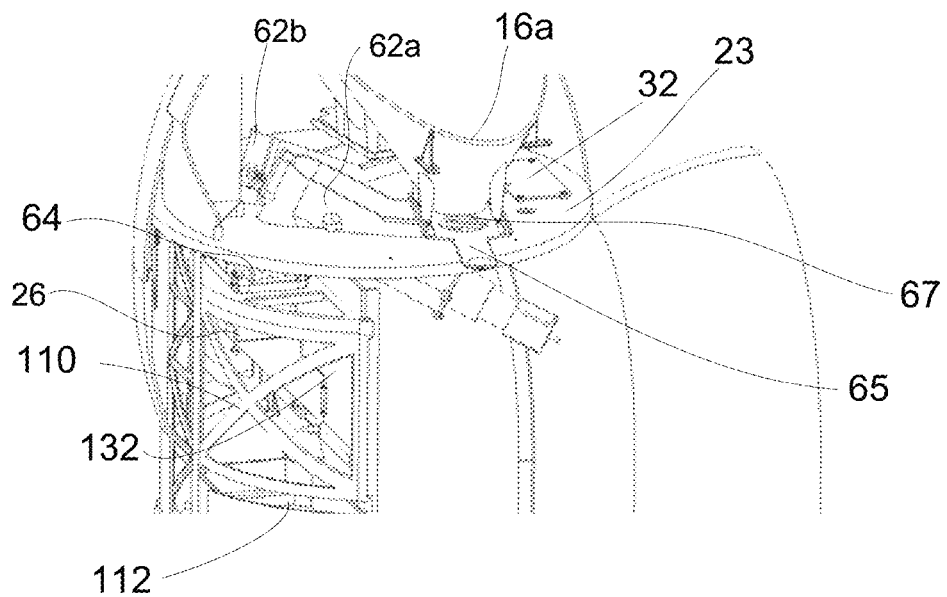
FIG. 8a is a cut-away perspective view of a weighing platform chamber and a feeding chamber.
Figure 8B:
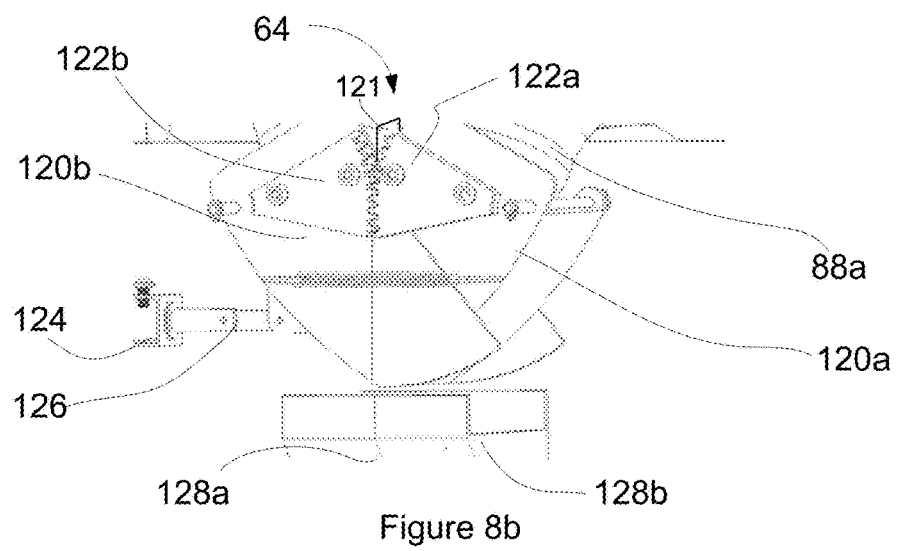
FIG. 8b is a perspective view of a weigh hopper.
Figure 8C:
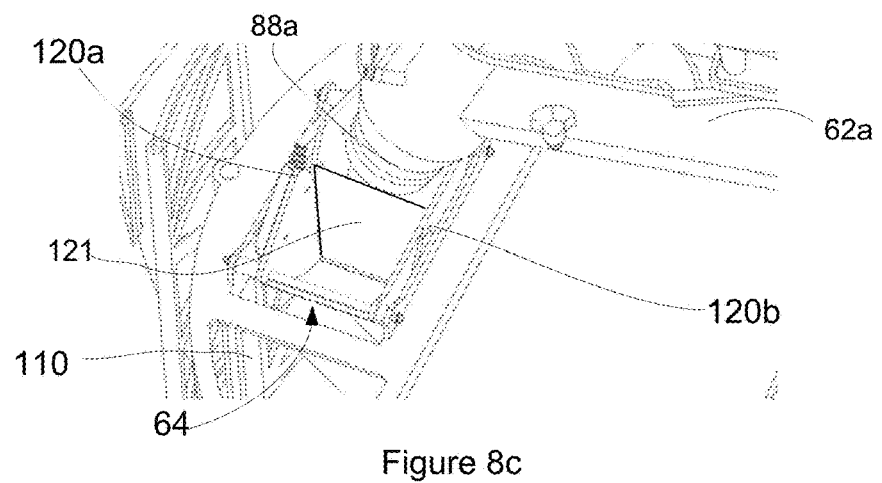
FIG. 8c is a top perspective view of the weigh hopper.
Figure 8D:
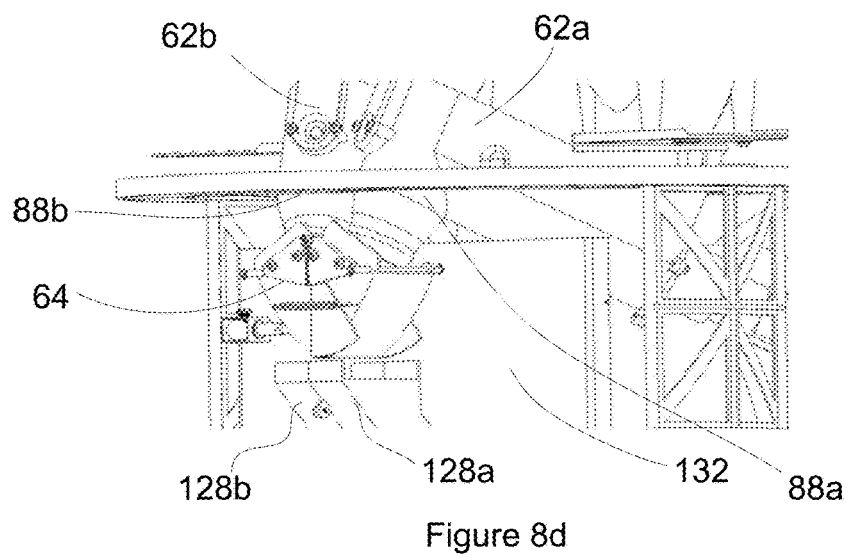
FIG. 8d is another perspective view of the weigh hopper.

Troughs 62a, 62b are angularly disposed within cutouts 68a, 68b of platform 30. As shown in FIG. 6, cut-outs 68a, 68b are angled towards each other at one end, such that food product 17 from troughs 62a, 62b is dispensed into the same weigh hopper 64. Looking at FIGS. 7a, 7b, and 7c, trough 62a is generally polygonal and comprises opposed longitudinal extending sidewalls 70, 72, joined by back wall 74 at back end 76 and by front wall 78 at front end 79, with base wall 80 connecting all walls 70, 72, 74 and 78. Opposed longitudinal extending sidewalls 70, 72 also include raised shoulders 81, 82 with flanges 83, 84 which extend from about midway between back end 76 and front end 79, and to back end 76. Trough opening 85 is defined by walls 70, 72, with raised shoulders 81, 82, and walls 74 and 78. On base wall 80, adjacent for front end 79 is trough dispensing port 86a connected to cylindrical spout 88a for conveying food product 17 from trough 62a. Back wall 74 includes circular opening 90 adjacent to base wall 80, which receives dispensing mechanism 63. Generally, dispensing mechanism 63 comprises auger member 90a mounted on shaft 92a, and coupled thereto is motor unit 94a and gear reducer 96, and auger member 90b mounted on shaft 92b, and coupled thereto is motor unit 94b and gear reducer 96. Auger members 90a and 90b, have similar features, and troughs 62a and 62b also have similar features. FIG. 7c shows a side view of food hopper 16a secured to flanges 83, 84 of trough 62a secured angularly on dispensing platform 23.

Food product 17 from supply hopper 16a is discharged via exit port 66a and received at back end 76 of trough 62a, and contained within raised shoulders 81, 82 while minimizing any overflow, and food product 17 is progressively pushed along trough 62a by auger member 90a from back end 76 towards trough dispensing port 86a coupled to cylindrical spout 88a. Auger member 90a is driven by motor unit 94a, such as a stepper motor, which provides a torque to rotate auger member 90a under the control of microprocessor 34 to dispense a known quantity of food product 17 from trough 62a. Accordingly, auger member 90a comprises a helical shaped flight 100 along longitudinally extending shaft 92, with a predetermined and progressive pitch between flight blades 102, as can be seen in FIG. 7b. For example, the flight pitch $Fp_1$ between flight blades 102a and 102b is smaller than the flight pitch $Fp_2$ between flight blades 102b and 102c, with the flight pitch $Fp_3$ between flight blades 102c and 102d being the largest spacing.

Troughs 62a, 62b with auger members 90a, 90b, respectively, are disposed within cut-outs 68a, 68b at an upward angle, such that food product 17 is received primarily at back end 76 and contained within raised shoulders 81, 82. The upward angle is selected to reduce the initial burst of food product 17 that would occur if walls 70, 72 of troughs 62a, 62b were substantially parallel with dispensing platform 23, and therefore results in improved progressive food dispensing control (degrees/gram of food). As food product 17 is pushed up trough 62a, the relative volume of food product 17 in each neighboring flight space $Fp_1$, $Fp_2$, $Fp_3$ increases. The progressive volume expansion between flight spaces $Fp_1$, $Fp_2$, $Fp_3$ allows food product 17 to settle and spread out over the course of travel to trough dispensing port 86a, which minimizes food product 17 being crushed on opposed longitudinal extending sidewalls 70, 72. In addition, progressive volume expansion between flight spaces $Fp_1$, $Fp_2$, $Fp_3$ and the upward angle of troughs 62a, 62b with auger members 90a, 90b, reduces the height of food product 17 within troughs 62a, 62b, which improves the flow control of food product 17, and minimizes food product 17 breaching the edges of walls 70, 72, whilst being pushed forward by rotating auger members 90a, 90b. Accordingly, most of food product 17 from supply hopper 16a is contained within raised shoulders 81, 82. The reduced height of food product 17 within troughs 62a, 62b beyond raised shoulders 81, 82 allows the natural bridging of food product 17 to occur earlier in the rotation of auger member 90a or 90b, and therefore improved food product 17 flow control is realized. The angle of repose of troughs 62a, 62b with auger members 90a, 90b also reduces bridging around trough dispensing port 86a or 86b.

In one example, one full revolution of the auger member 90a or 90b may be calibrated to dispense food product 17 in a single pitch of the flight. By having knowledge of the amount of food product 17 stored in one pitch between the adjacent auger blades 102a and 102b, or 102b and 102c, or 102c and 102d, then a predetermined number of rotational degrees of auger member 90a or 90b results in a corresponding known amount of food product 17 being dispensed. For example, one complete rotation may result in 5 grams of food product 17 being dispensed, while a half-revolution results in 2.5 grams of dispensed food product 17.

As shown in FIGS. 8a to 8d, weigh hopper 64 is positioned below cylindrical spout 88a to receive food product 17 from trough 62a, and cylindrical spout 88b to receive food product 17 from trough 62b. Weigh hopper 64 is mounted on weighing platform 110 disposed in weighing platform chamber 19 in lower portion 14, such that food product 17 can be weighed before being conveyed to feeding chamber 18. Any left-over food product 17 remaining on feeding platform 28 is directed into disposal bins 112, 114, also mounted on weighing platform 110, and therefore the left-over food product 17 can be weighed, as will be explained in more detail below. By introducing an area where weighing can occur before food product 17 is dispensed to animal 11, an accurate, undisturbed measurement can be achieved. For example, weighing platform 110 is built across 3 load cell sensors 116a, 116b and 116c, which are arranged in a summing network.

In more detail, hopper 64 comprises a pair of load jaw sections 120a, 120b, separated by baffle 121, and hingedly mounted on weighing platform 110. Load jaw sections 120a, 120b are coupled to each other via jaw gear linkages 122a, 122b, as shown in FIGS. 8a to 8d. The initial tare of hopper 64 and disposal bins 112, 114 in an empty state is recorded. Food product 17 from trough 62a is received in load jaw section 120a, while food product 17 from trough 62b is received in load jaw section 120b. The weight of the dispensed food product 17 is measured and recorded. Weigh hopper solenoid 124 is coupled to hopper 64 via linkage arm 126, and is actuated to open load jaw sections 120a, 120b following a weighing event, and food product 17 from load jaw section 120a is conveyed into chute section 128a, while food product 17 from load jaw section 120b is conveyed into chute section 128b, enroute to feeding platform 28. Chute sections 128a, 128b are separate from each other such that food product 17 from load jaw sections 120a and 120b do not mix. Chute sections 128a, 128b terminate at chute opening 130 in separator wall 132 fixedly attached to base 15, and food product 17 from load jaw sections 120a and 120b is received on feeding platform 28 via chute opening 130. Separator wall 132 is disposed between feeding chamber 18 and weighing platform chamber 19, and extends between upper end 137, below troughs 62a, 62b adjacent to cylindrical spouts 88a, 88b to lower end 138 abutting base 15.

Now looking at FIGS. 9a to 9e, feeding platform 28 is a hemi-circular disc, with top surface 131, radially extending outwardly from separation wall 132 into feeding chamber 18, and is fixedly attached to adjacent lower end 138 of separation wall 132. Feeding platform 28 is elevated above base 15 by hemi-cylindrical, squat mounting member 136, abutting bottom surface 139 of hemi-circular disc of feeding platform 28. Hemi-cylindrical, squat mounting member 136 extends radially outwardly into feeding chamber 18, and is fixedly attached to base 15 and separator wall 132. Hemi-circular disc of feeding platform 28 and hemi-cylindrical, squat mounting member 136 have substantially the same radius. On other side of separator wall 132 at the rear of feeding station 10 are disposal bins 112, 114 resting on weighing platform 110, and disposed adjacent to base 15. The height of disposal bins 112, 114 is less than the height of feeding platform 28 above base 15, and disposal bins 112, 114 are slidably removable from lower portion 14 for disposal of unconsumed food product 17.

Positioned above feeding platform 28 is hemi-frustoconical sweeping member 140 resembling half of a base-less frustoconical bowl, with hemi-circular upstanding wall 142 in a vertical axis, and having a radius that is greater than the radius of hemi-circular disc of feeding platform 28 and hemi-cylindrical, squat mounting member 136. Hemi-circular upstanding wall 142 comprises free top edge 144, and free opposed side edges 148, 150 orthogonal to free top edge 144, and bottom edge 152. Angled hemi-circular platform wall 154 extending inwardly from bottom edge 152 of hemi-circular upstanding wall 142, oblique to the vertical axis with edges 158, 160, and includes free, bottom edge 156 abutting top surface 131 of feed platform 28. The radius of angled hemi-circular platform wall 154 that is substantially the same as the radius of hemi-circular disc of feeding platform 28 and hemi-cylindrical, squat mounting member 136. Longitudinal, angled wall 162 extends inwardly between edges 158, 160, and includes free, longitudinal top edge 164 and free, longitudinal bottom edge 166 abutting top surface 131 of feed platform 28. Accordingly, when food product 17 arrives via chute 130, it lands on top surface 131 of feeding platform 28 and is contained primarily by angled hemi-circular platform wall 154 and longitudinal, angled wall 162. Accordingly, hemi-circular upstanding wall 142, angled hemi-circular platform wall 154 and longitudinal, angled wall 162 may be unitarily-formed. About midway of longitudinal, angled wall 162 is gear-head housing 170 for receiving drive gear 172 coupled to sweeping member servo 174 fixedly attached to base 15. Sweeping member servo 174 is actuable to rotate hemi-frustoconical sweeping member 140 through cut-outs 180, 182, 184 in separator wall 130, before and after a feeding event.

Figure 9A:
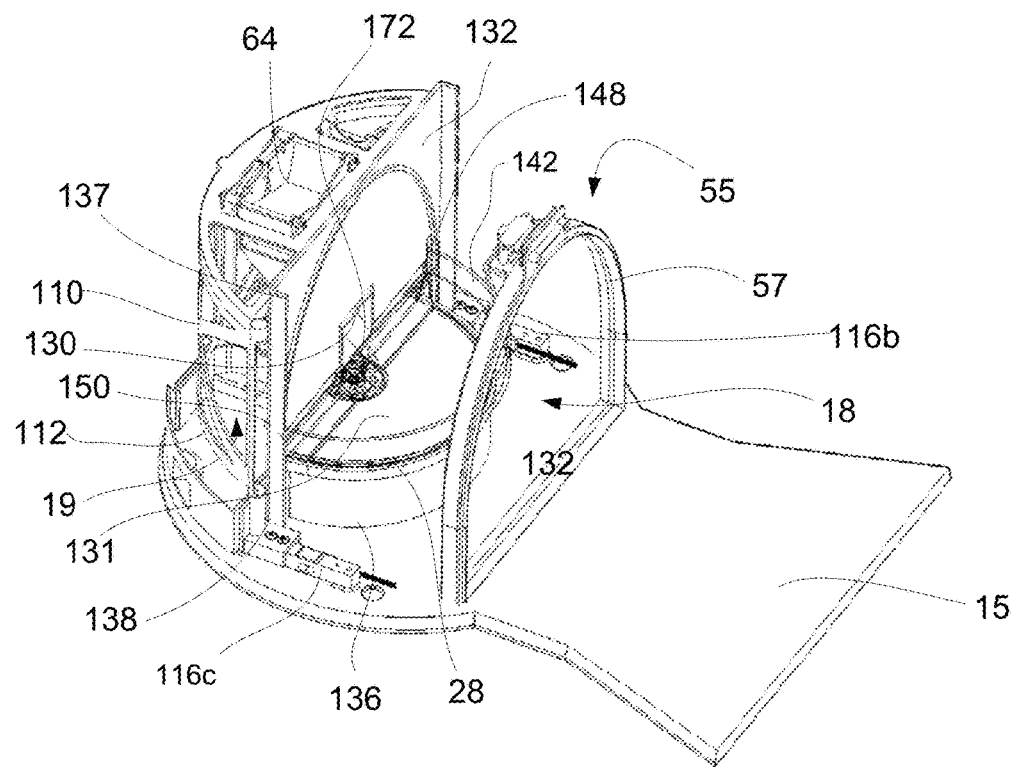
FIGS. 9a to 9c show various perspective views of the weighing platform chamber and the feeding chamber.
Figure 9B:
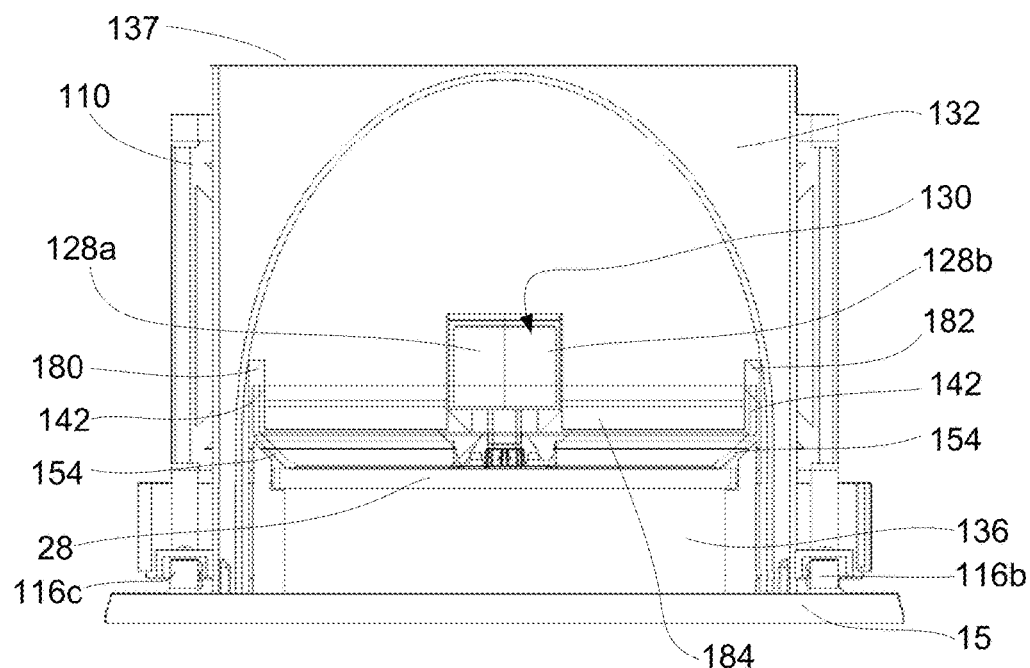
Figure 9C:
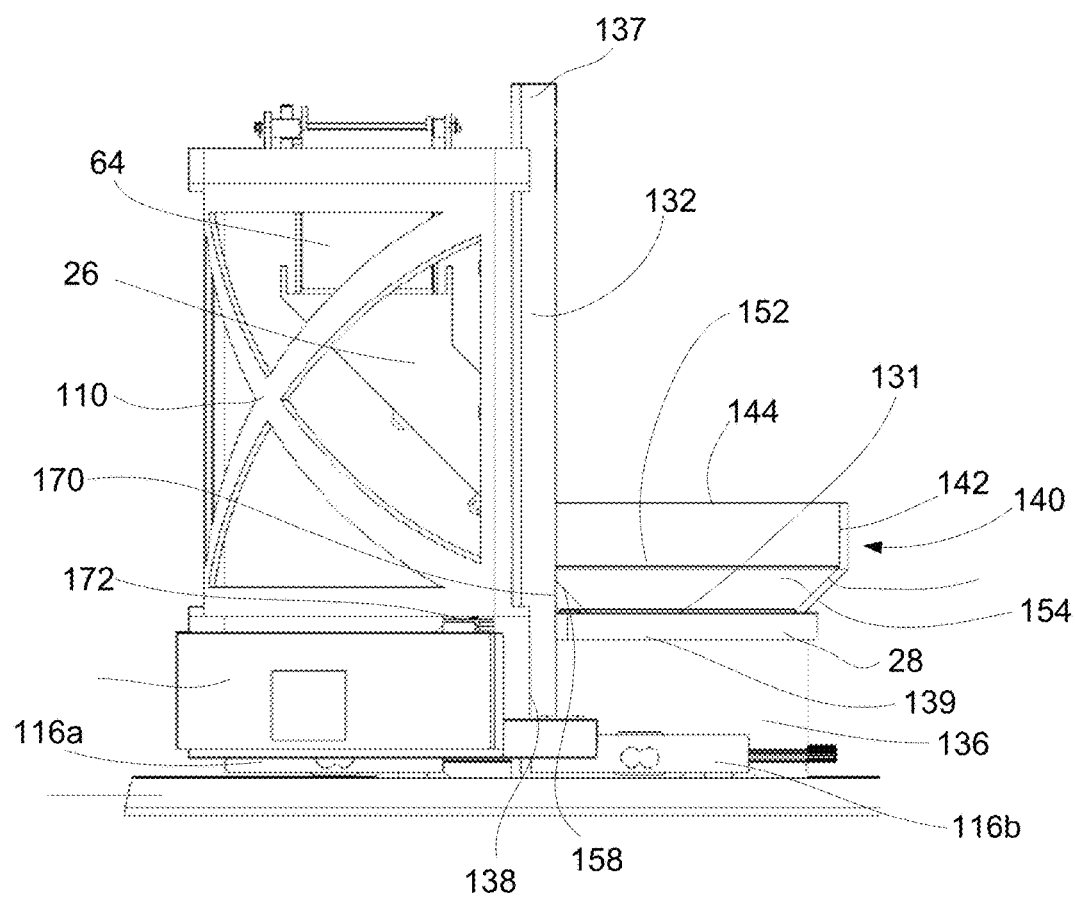
Figure 9D:
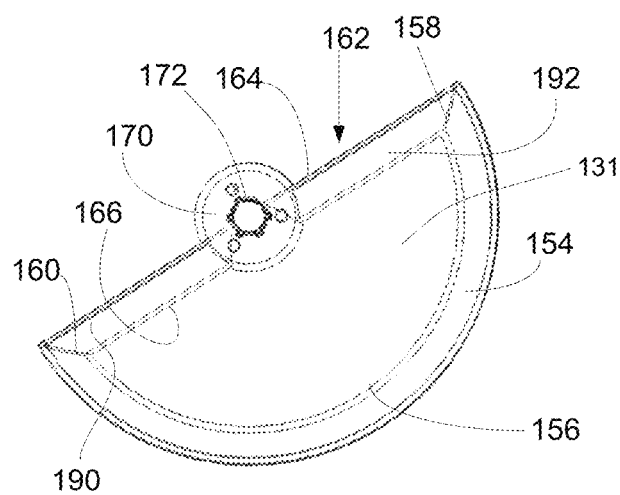
FIG. 9d shows a top view of a hemi-frustoconical sweeping member on a feeding platform.
Figure 9E:
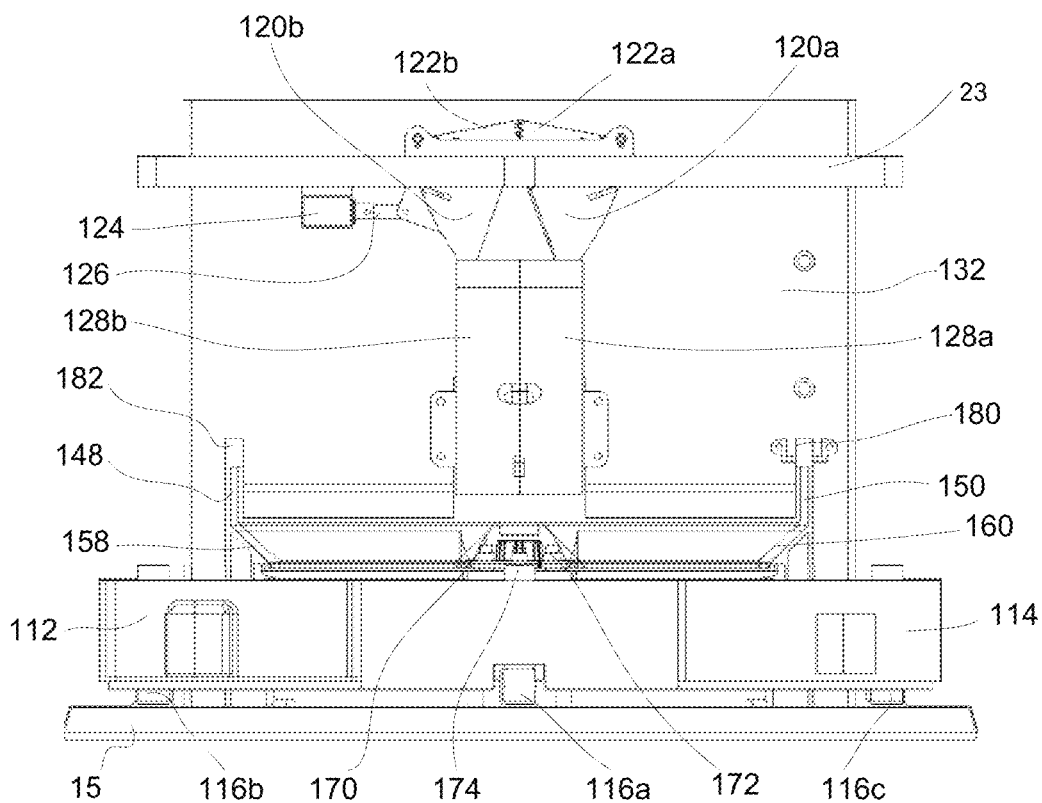
FIG. 9e shows a back view of the weighing platform chamber.

As can be seen in FIG. 9e, cut-out 182 is dimensioned to fit free opposed side edge 148, and cut-out 180 is dimensioned to fit free opposed side edge 150, such that hemi-circular upstanding wall 142 with free top edge 144 can rotate in and out of cut-outs 180 and 182. Meanwhile, cut-out 184 is dimensioned to fit angled hemi-circular platform wall 154 and longitudinal, angled wall 162, such unitarily-formed angled hemi-circular platform wall 154 and longitudinal, angled wall 162 can rotate in and out of cut-out 184. Accordingly, hemi-frustoconical sweeping member 140 can be positioned within feeding chamber 18 or weighing platform chamber 19.

FIGS. 10a to 10f show the various positions of hemi-frustoconical sweeping member 140 as it is rotated between feeding chamber 18 and weighing platform chamber 19.

Figure 10A:
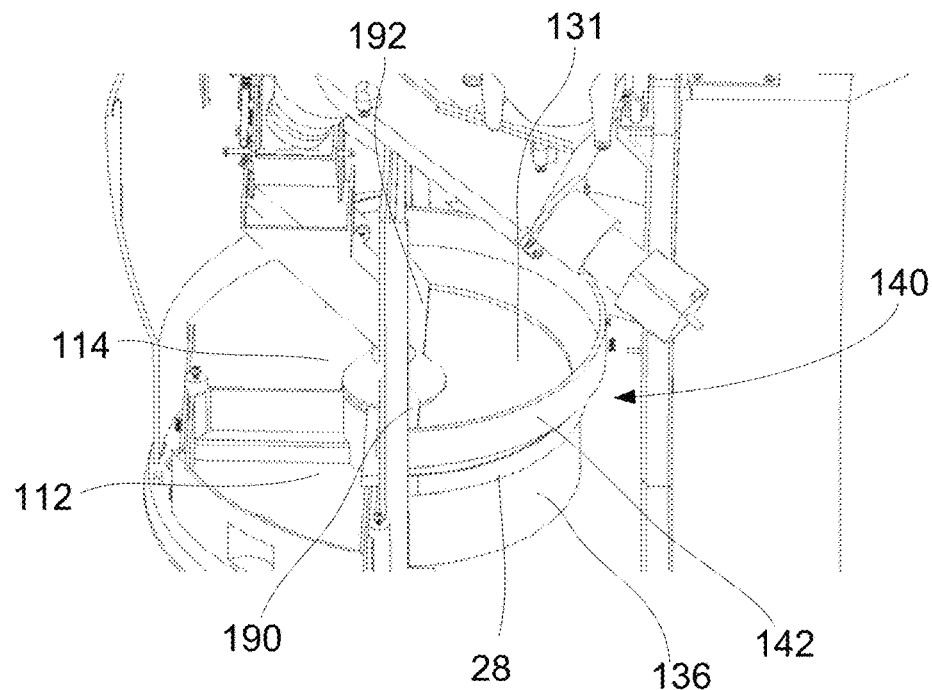
FIGS. 10a to 10f show various positions of the hemi-frustoconical sweeping member as it is rotated between the feeding chamber and the weighing platform chamber.

In FIG. 10a, hemi-frustoconical sweeping member 140 is positioned directly above feeding platform 28 such that free bottom edge 156 of angled hemi-circular platform wall 154 and free, longitudinal bottom edge 166 of longitudinal, angled wall 162 engage top surface 131 of feeding platform 28, and free, longitudinal top edge 164 of leading half-portion 190 and trailing half-portion 192 of longitudinal, angled wall 162 are co-axially aligned with separation wall 132.

Figure 10B:
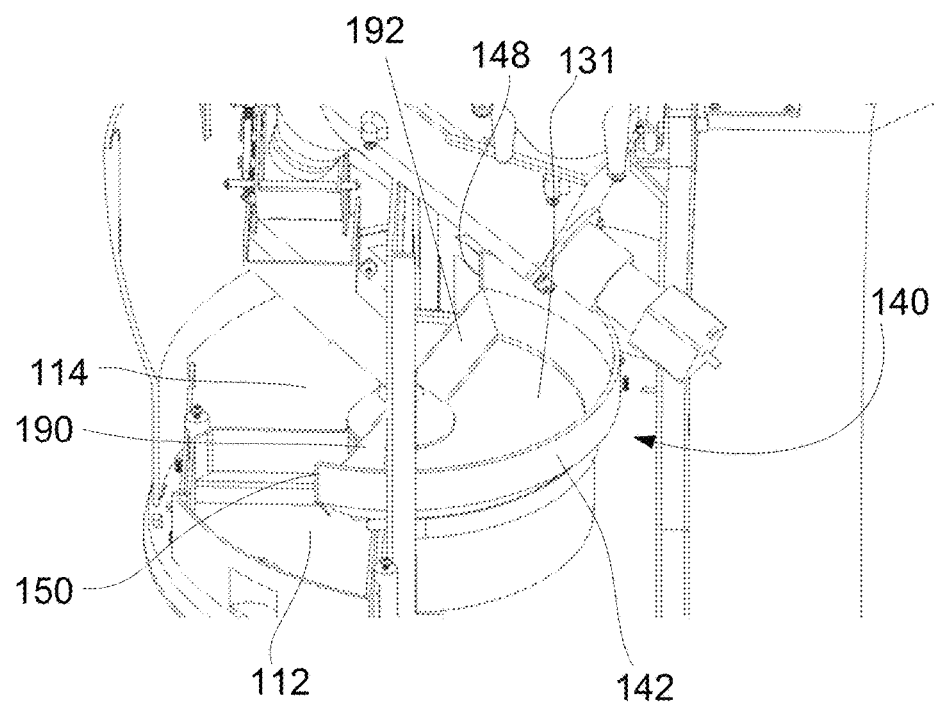
Figure 10C:
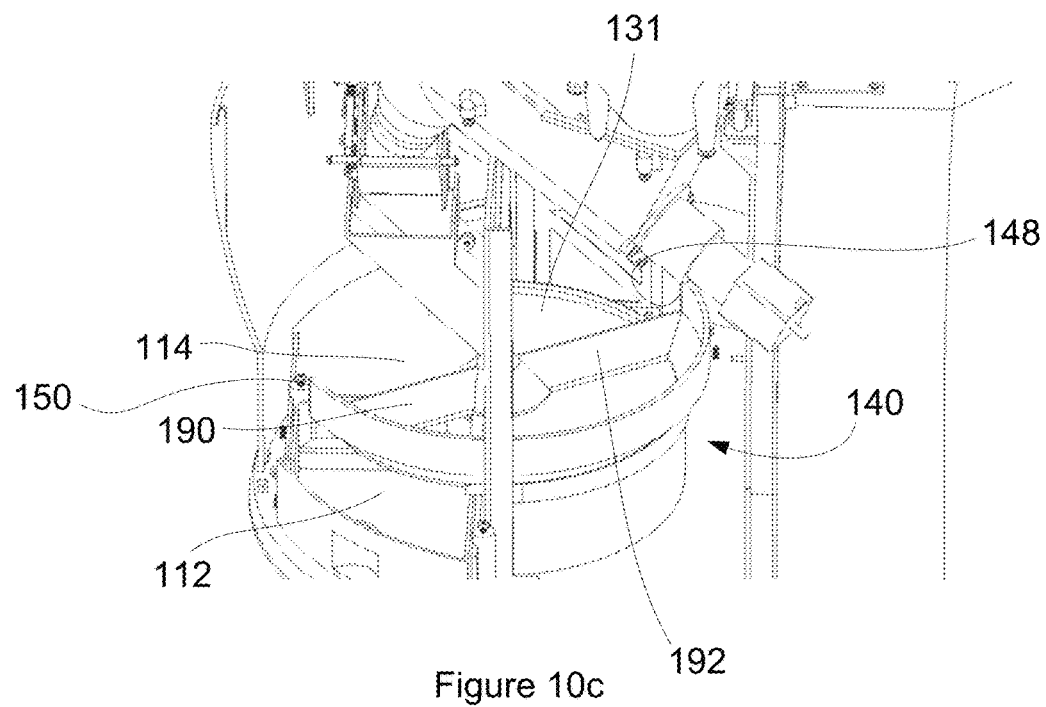

In FIGS. 10b and 10c, hemi-frustoconical sweeping member 140 has started to rotate clockwise, and free opposed side edge 150 of hemi-circular upstanding wall 142 has traversed cut-out 180, and portions of angled hemi-circular platform wall 154 and longitudinal, angled wall 162 have traversed cut-out 184. FIG. 10c shows leading half-portion 190 of longitudinal, angled wall 162 positioned substantially above disposal bin 112, while other trailing half-portion 192 of longitudinal, angled wall 162 is positioned about midway of feeding platform 28. Accordingly, any food product 17 remaining on top surface 131 is progressively swept by trailing half-portion 192 of longitudinal, angled wall 162 into disposal bin 112.

Figure 10D:
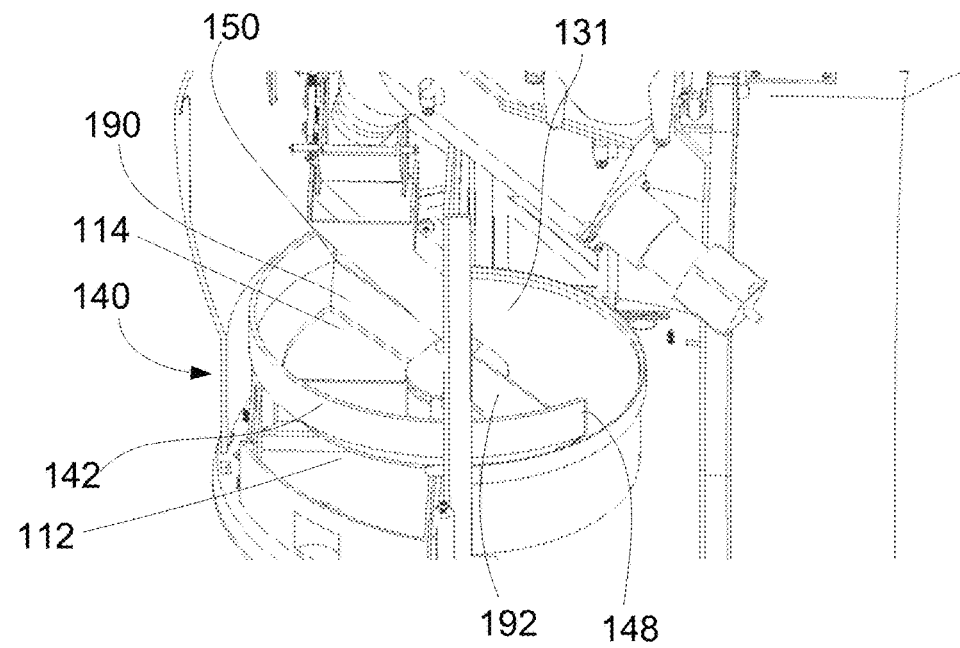

In FIG. 10d, the majority of hemi-frustoconical sweeping member 140 is now within weighing platform chamber 19. Leading half-portion 190 is positioned substantially above disposal bin 114, while trailing half-portion 192 is still positioned on feeding platform 28, adjacent to separation wall 132. Accordingly, most of food product 17 remaining on top surface 131 has now been swept by trailing half-portion 192 into disposal bin 112.

Figure 10E:
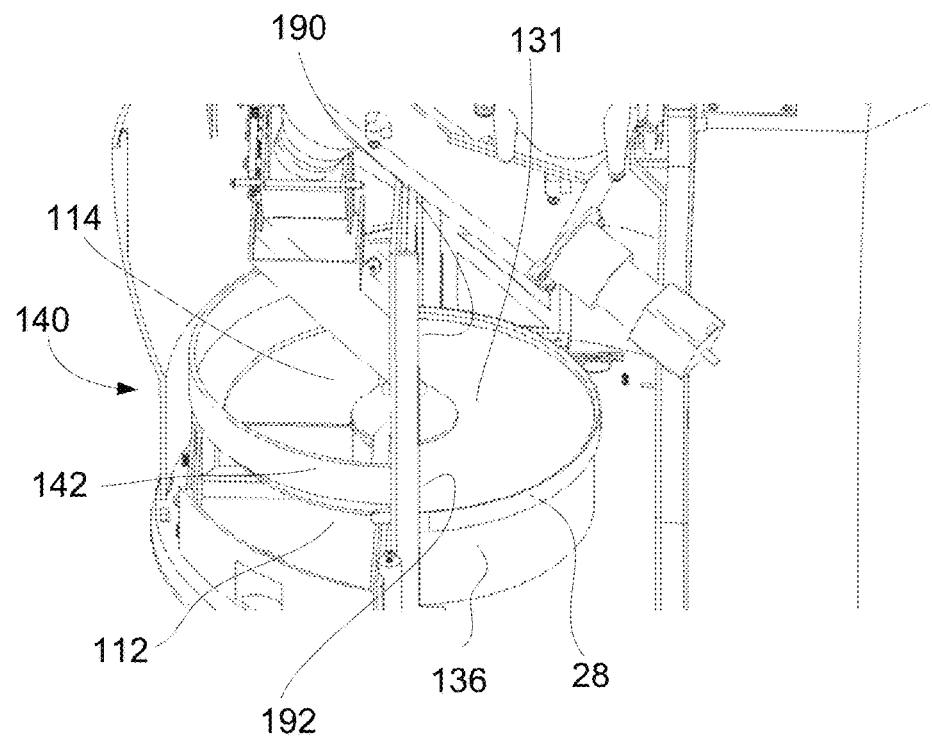
Figure 10F:
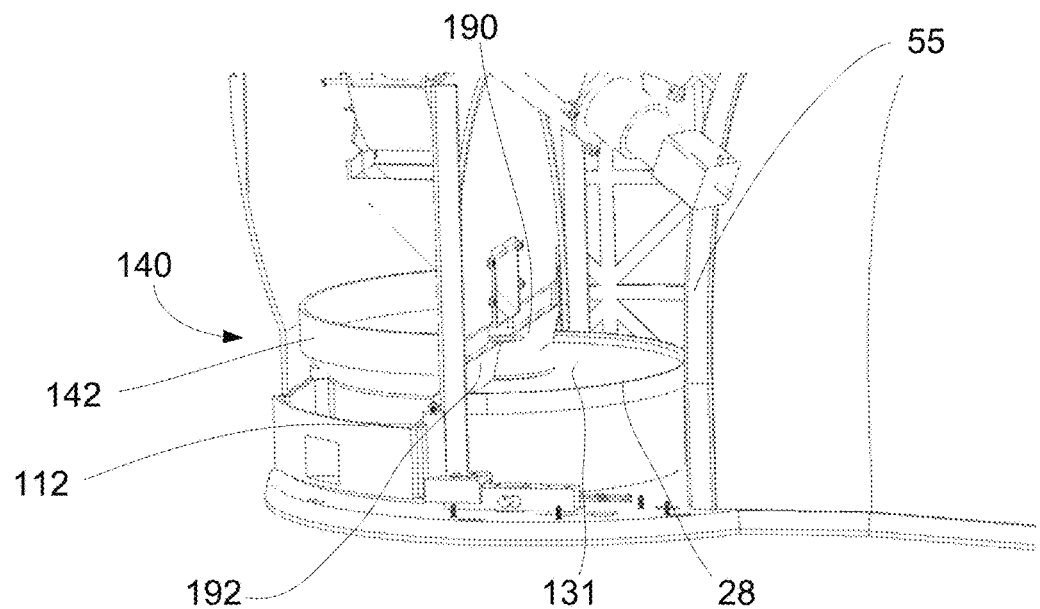

In FIGS. 10e and 10f, hemi-frustoconical sweeping member 140 is now contained within weighing platform chamber 19, and free, longitudinal top edge 164 of leading half-portion 190 and trailing half-portion 192 of longitudinal, angled wall 162 are co-axially aligned with separation wall 132. Accordingly, all of food product 17 remaining on top surface 131 has now been swept by trailing half-portion 192 into disposal bin 112.

When animal 11 leaves feeding tunnel 20, hemi-frustoconical sweeping member 140 wipes off remaining food product 17 into the correct bin 112 or 114, depending on the type of food product 17 that was originally dispensed. After hemi-frustoconical sweeping member 140 clears feeding platform 28, the weight of disposal bin 112 or 114 is then measured again, and recorded, thereby allowing determination of the weight of food product 11 consumed by animal 11. Before another animal 11 enters feeding tunnel 20, another tare of hopper 64 and disposal bins 112, 114 in an empty state is recorded and the entire process repeats.

Figure 11A:
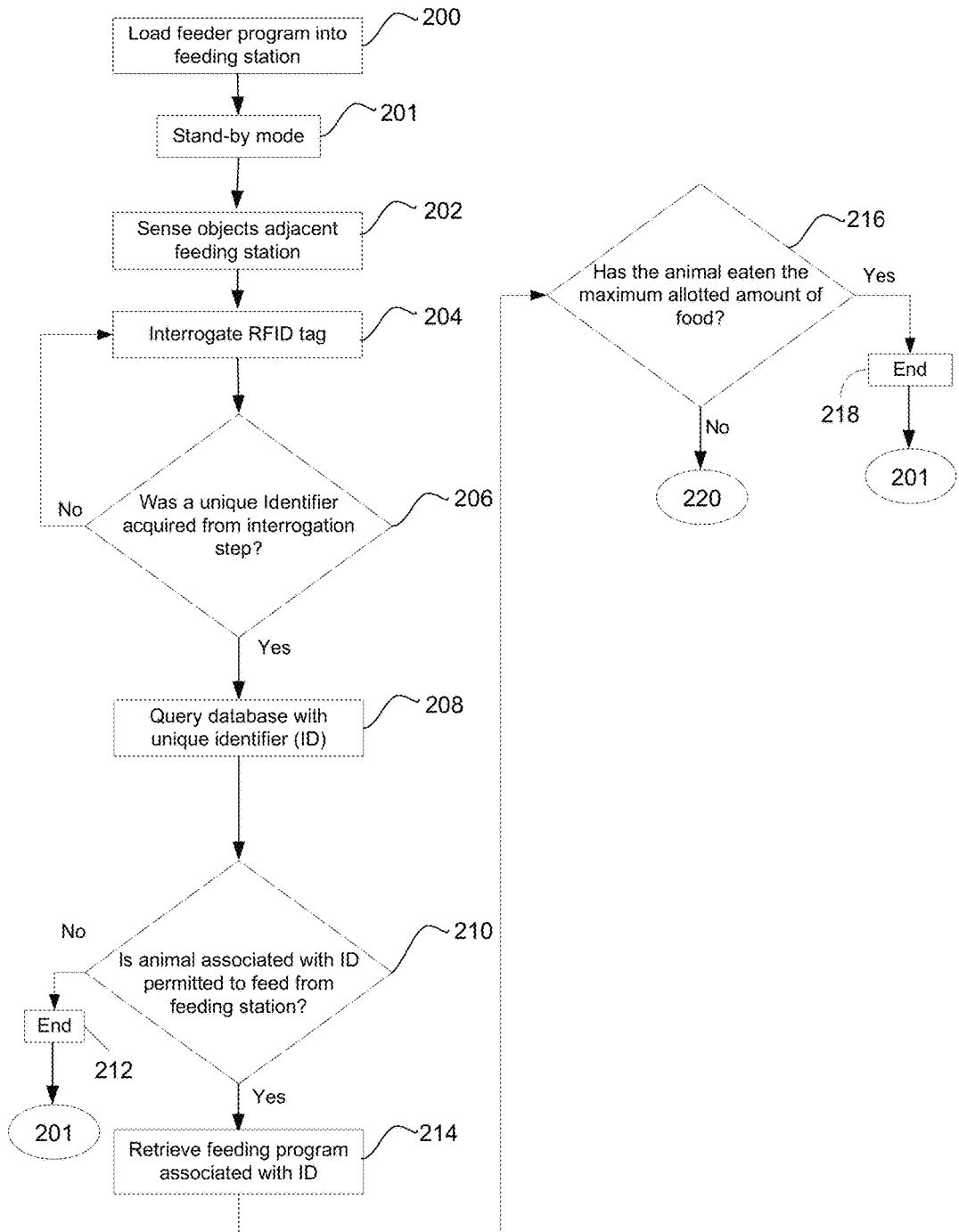
FIGS. 11a to 11c show a high level flow diagram illustrating exemplary process steps for automatically feeding a uniquely-identified animal.
Figure 11B:
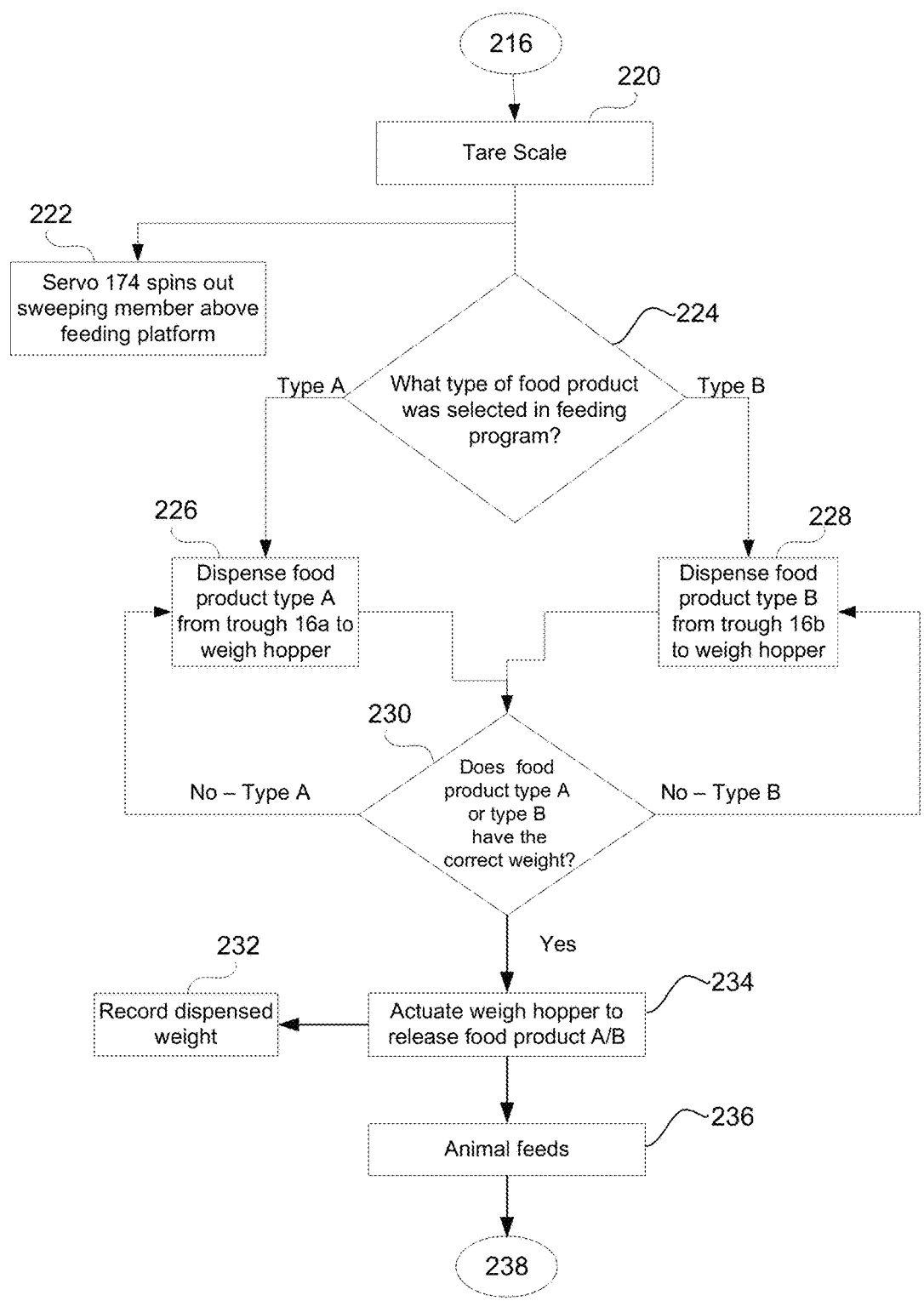
Figure 11C:
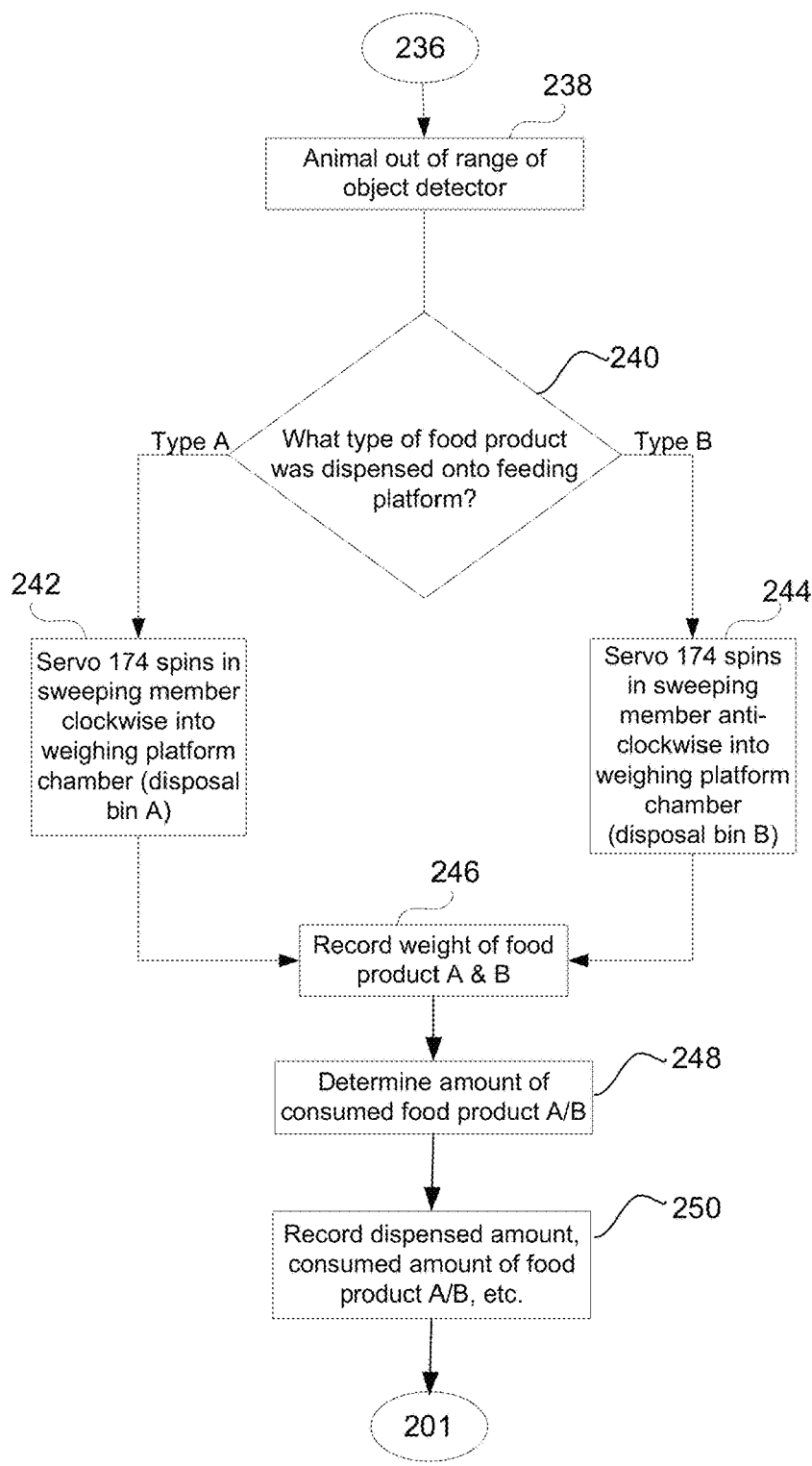

FIGS. 11*a* to 11*c* show a high level flow diagram illustrating exemplary process steps for automatically feeding a uniquely-identified animal 11 in accordance with the dietary needs thereof. It is foreseen that multiple animals 11 may be automatically fed specific meals based on their unique identity. Using user interface 52 or user device 49, an animal profile is created. Accordingly, feeding station 10 may be programmed to provide food product 17 to animal 11 having an animal profile, and the animal profile is associated with a unique serial number of RFID tag 58 carried by animal 11. For example, a mobile application on user device 49 allows programming of feeding station 10 (step 200). The animal profile comprises, but is not limited to, name, age, sex, breed and weight of animal 11, activity level, an indication as to whether animal 11 is pregnant or nursing, and whether animal 11 has health issues such as diabetes, or whether animal 11 is overweight, underweight or needs to maintain its current weight. Also, the current diet of animal 11 may be entered, e.g. a breakdown in percentages of the raw food, kibble and wet food. The user may select foods or food products 17 for dispensation from a list from database 53 with types of food products 17, and brands of food products 17, manufacturer of food products 17, periodically updated by a remote server 50, or the user may enter the type or brand of food manually. Based on the animal profile and selected food products 17, microprocessor 34 calculates the cat's nutritional requirements, such as the recommended number of daily calories required for that particular cat, and determines the number of daily feedings, feeding times, quantity of food product 17 per feeding event, and presents the recommendations to the user for review, editing and approval. According to the Animal Medical Center in New York, U.S.A., a healthy, active 8-pound adult cat requires about 30 calories per pound per day. Therefore, the average 8-pound cat requires about 240 calories per day. As previously discussed, monitoring the weight and feeding habits of animal 11 allows the microprocessor 34 to adjust the nutritional requirements as needed. However, it should be noted that the nutritional requirements are also dependent on individual metabolism, genetics, health status, environment, outdoor temperature, and other individual factors. Customization of the daily feeding regimen for a particular animal 11 may also be performed manually by the user, if desired.

With feeding station 10 programmed, supply hoppers 16*a*, 16*b* are replenished with the desired food product 17 for feeding animal 11, and feeding station 10 is placed in standby mode in which power consumption is reduced. In step 202, when an object approaches and enters the tunnel entrance 22, presence detecting devices 60 detect the presence of the object, and when the object approaches feeding platform 28, animal sensing module 40 is actuated to trigger RFID reader 55 to transmit interrogating signals in search for any RFID tag 58 within its read range; and within feeding chamber 18. Alternatively, RFID reader 55 acts as a presence detecting device 60 by periodically transmitting interrogation signals in search for any RFID tag 58 within its read range (step 204); and within feeding chamber 18, such that a feeding sequence can be initiated. In step 206, a determination is made as to whether the unique identifier associated with RFID tag 58 is obtained, and if the unique identifier can not be obtained then step 204 is repeated, otherwise a query is issued to the database 53 (step 208) to determine whether the unique identifier is associated with animal 11 authorized to feed from feeding station 10 (step 210). When the unique identifier is associated with an animal 11 without feeding privileges, then the process ends (step 212), and subsequently returns to step 201, and feeding station 10 is placed into standby mode; otherwise an animal profile associated with the acquired unique identifier is retrieved from database 53 (step 214), and the animal profile sets out the type and quantity of food animal 11 is allowed to eat, including the feeding frequency.

Next, a determination is made as to whether animal 11 has consumed the maximum amount of food permitted in a predetermined time period (step 216). When animal 11 has consumed the maximum food allotment for that time period, then the process ends (step 218) and subsequently returns to step 201, otherwise the initial tare of hopper 64 and disposal bins 112, 114 in an empty state is recorded and the weight is offset or recalibrated to zero (step 220), and sweeping member servo 174 spins out hemi-frustoconical sweeping member 140 from weighing platform chamber 19 to feeding chamber 18 such that hemi-frustoconical sweeping member 140 is positioned directly on feeding platform 28 (step 222), in order to receive food product 17. Next, the type of food product 17 to be dispensed is determined (step 224); when food product 17 of a first type (A) is required, then microprocessor 34 outputs a set of instructions to auger motor unit 94*a* of auger member 90*a* of food dispensing mechanism 63 to dispense the allowed food portion to weigh hopper 64 from trough 62*a* holding the first type (A) of food product 17 (step 226); and when food product 17 of a second type (B) is required, then microprocessor 34 outputs a set of instructions to auger motor unit 94*b* of auger member 90*b* of food dispensing mechanism 63 to dispense the allowed food portion to weigh hopper 64 from trough 62*b* holding the second type (B) of food product 17 (step 228).

As noted above, supply hoppers 16*a*, 16*b* may hold the same food product 17 or different food products 17 feed depending on the diet of animal 11, or user preferences. Next, food product 17 in weigh hopper 64 is weighed, and a determination is made as to whether food product 17 in weigh hopper 64 has the desired or correct weight (step 230). If the weight is not correct, then the process returns to step 226 and step 228, otherwise weigh hopper solenoid 124 is actuated to open weigh hopper 64 for a predetermined time to release food product 17 into drop chute 26, with food product 17 from trough 62*a* descending via chute section 128*a*, and food product 17 from trough 62*b* descending via chute-portion 128*b* (step 232), to accumulates on feeding platform 28, and is contained thereon by hemi-frustoconical sweeping member 140. The dispensed weight of food product 17 is taken by load cell sensors 116*a*, 116*b* and 116*c*, and recorded in database 53 (step 234), and animal 11 consumes food product 17 (step 236). Following the feeding event, typically indicated by exit of animal 11, as detected by RFID reader 55 or the tunnel entrance sensors 60 (step 238), in step 240 a determination is made as to the type (A or B) of food product 17 that was dispensed based on steps 226, 228. If food product 17 of a first type (A) was dispensed, then sweeping member servo 174 is actuated to rotate hemi-frustoconical sweeping member 140 clockwise, such that food product 17 remaining on top surface 131 is been swept by trailing half-portion 192 into disposal bin 112 (step 242); and if food product 17 of a second type (B) was dispensed, then sweeping member servo 174 is actuated to rotate hemi-frustoconical sweeping member 140 anti-clockwise, such that food product 17 remaining on top surface 131 is been swept by leading half-portion 190 into disposal bin 114 (step 244). Removing unconsumed food product 17 prevents another animal 11 from wandering into feeding chamber 18 and ingesting a food product 17 that is not intended for that other animal 11. In step 246, the weight of each food type (A or B) in disposal bin 112 and/or 114 is recorded, and a determination of the amount of food consumed by animal 11 (step 248), and aspects associated with the feeding event are recorded, such as: date and time, time of entry, time of departure, unique identifier associated with animal 11; bowl identifier, type of food product 17, manufacturer of food product 17, amount of food product 17 dispensed, amount of food product 17 consumed, feeding rate, and stored in database 53 (step 250), and feeding station 10 returns to stand-by mode and waits to detect another RFID tag 58 to initiate another feeding session.

Figure 12:
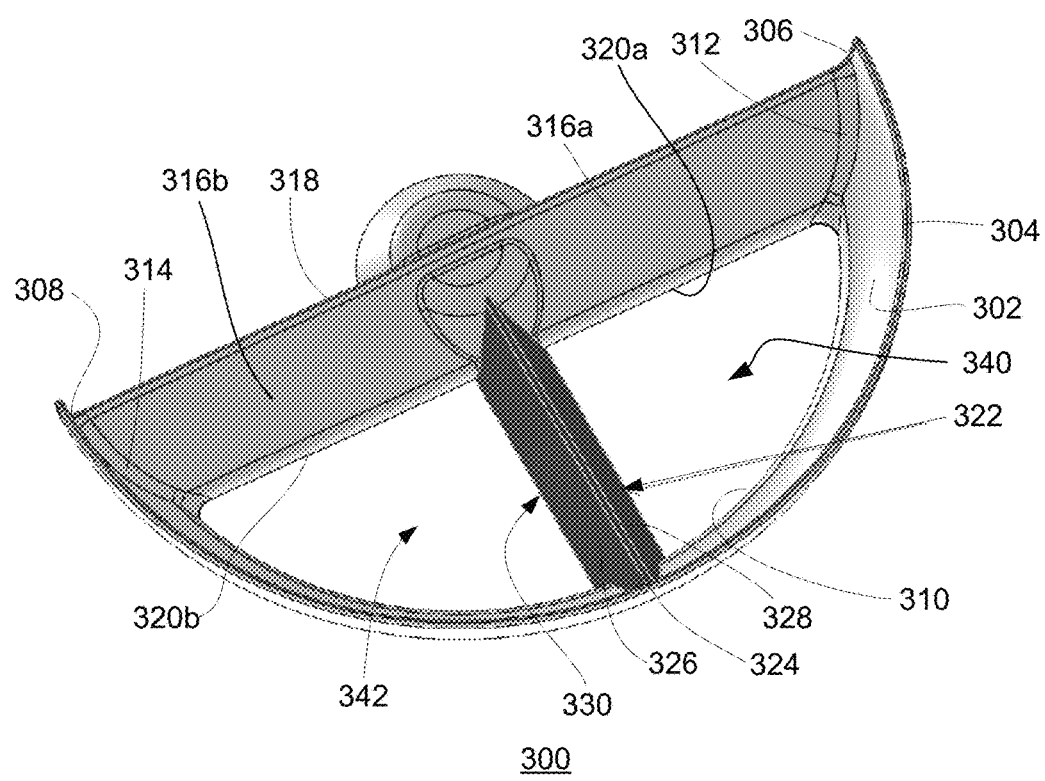
FIG. 12 show a hemi-frustoconical sweeping member, in another embodiment.

FIG. 12 shows another embodiment of a hemi-frustoconical sweeping member 300 resembling half of a base-less frustoconical bowl, with hemi-circular upstanding wall 302 in a vertical axis, and having a radius that is greater than the radius of hemi-circular disc of feeding platform 28 and hemi-cylindrical, squat mounting member 136. Hemi-circular upstanding wall 302 comprises free top edge 304, and free opposed side edges 306, 308 orthogonal to free top edge 304, and bottom edge 310. Angled hemi-circular platform wall 312 extending inwardly from bottom edge 310 of hemi-circular upstanding wall 302, oblique to the vertical axis with edges 312, 314, and includes free, bottom edge 310 abutting top surface 131 of feed platform 28. The radius of angled hemi-circular platform wall 312 that is substantially the same as the radius of hemi-circular disc of feeding platform 28 and hemi-cylindrical, squat mounting member 136. Longitudinal, angled wall 316, with sections 316a, 316b, extends inwardly between edges 306, 308, and includes free, longitudinal top edge 318 and free, longitudinal bottom edge 320, with sections 320a, 320b, abutting top surface 131 of feed platform 28. Positioned midway of longitudinal angled wall 216 and hemi-circular upstanding wall 302 is divider 322. As can be seen, divider 322 is wedge-shaped and comprises spine 324 with slanting walls 326, 328 extending therefrom and terminating at free bottom edges 330, 332, respectively.

Accordingly, sweeping member 300 comprises first compartment 340 for receiving food product 17 of a first type (A) and first compartment 342 for receiving food product 17 of a first type (B).

Figure 13A:
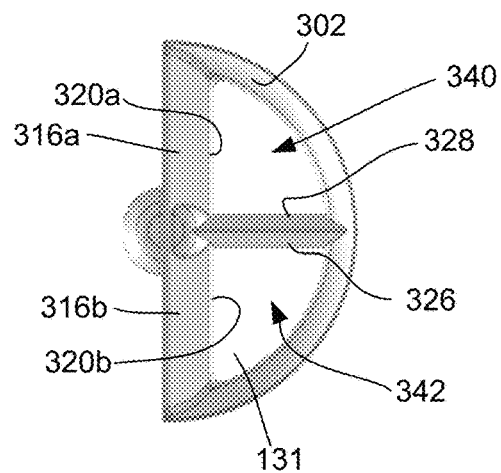
FIGS. 13a to 13c show various positions of the hemi-frustoconical sweeping member of FIG. 12 as it is rotated between the feeding chamber and the weighing platform chamber.
Figure 13B:
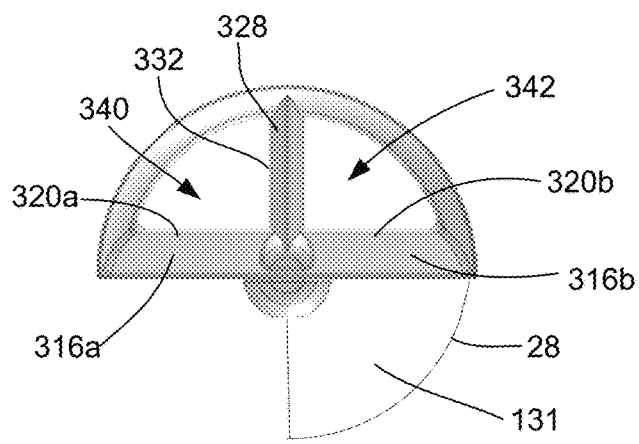

Accordingly, with sweeping member 300 disposed in a first position, as shown in FIG. 13a, a known quantity of food product 17 of a first type (A) from load jaw section 120a is conveyed into chute section 128a onto feeding platform 28, and is received in first compartment 342. After a feeding event of food product 17 of a first type (A), then sweeping member servo 174 is actuated to rotate hemi-frustoconical sweeping member 300 90 degrees anti-clockwise into a second position, as shown in FIG. 13b, such that any food product 17 of a first type (A) remaining on top surface 131 is been swept by slanting wall 328 of trailing divider 322 into disposal bin 114. The weight of food product 17 of food type (A) in disposal bin 114 is then recorded, and a determination of the amount of food product 17 of food type (A) consumed by animal 11 is made.

Figure 13C:
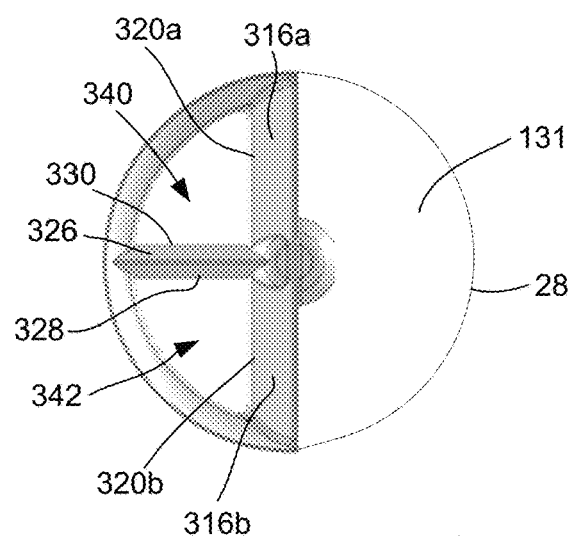

Next, sweeping member servo 174 is actuated to rotate hemi-frustoconical sweeping member 300 90 degrees anti-clockwise into the first position as shown in FIG. 13a. A known quantity of food product 17 of a second type (B) from load jaw section 120b is conveyed into chute section 128b onto feeding platform 28, and is received in second compartment 344. After a feeding event of food product 17 of a second type (B), sweeping member servo 174 is actuated to rotate hemi-frustoconical sweeping member 300 180 degrees clockwise to place hemi-frustoconical sweeping member 300 into a third position, as shown in FIG. 13c, such that any food product 17 of a first type (B) remaining on top surface 131 is been swept by slanting wall 326 of trailing divider 322 into disposal bin 112. The weight of food product 17 of food type (A) in disposal bin 114 is recorded, and a determination of the amount of food product 17 of food type (A) consumed by animal 11 is made.

Accordingly, as described above, aspects associated with the feeding event are recorded, such as: date and time, time of entry, time of departure, unique identifier associated with animal 11; bowl in database 53. Subsequently, hemi-frustoconical sweeping member 300 is returned to the first position, and feed station 10 returns to stand-by mode and waits to detect another RFID tag 58 to initiate another feeding session.

In yet another embodiment, divider 322 is removably attached between longitudinal angled wall 316 and hemi-circular upstanding wall 302 to form compartments 340, 342 of equal size or differing sizes, depending on the animal 11, food type, diet or feeding schedule. Alternatively, multiple dividers 322 are removably attached between longitudinal angled wall 316 and hemi-circular upstanding wall 302 to form multiple compartments of equal size or differing sizes.

In yet another embodiment, feeding station comprises a plurality of food dispensing unit having means for dispensing controlled portions of said first food product;

a second food dispensing unit having means for dispensing controlled portions of said second food product;

a weigh hopper having a first section for receiving said first food product from said first food dispensing unit; and a second section for receiving said second food product from said second food dispensing unit;

a feeding platform within said enclosure for receiving said food product from said weigh hopper, and a feeding platform sweeping member comprising a first compartment to receive said first food product and a second compartment to receive said second food product; and whereby feeding platform sweeping member is caused to clear unconsumed said first food product and unconsumed second food product off said feeding platform.

In another exemplary embodiment, the diet of animal 11 including food consumption, feeding patterns, are monitored to provide an up-to-date health report, and notifications pertaining to any changes in the health status of animal 11, or feeding habits, are provided based on historical data, predetermined thresholds, or user-defined thresholds. Such reports may also be made available to a third party, such as an owner of animal 11, guardian, veterinarian, animal hospital, manufacturer of food product 17, or insurance provider. Alerts are issued when the bounds of these thresholds are exceeded.

In another exemplary embodiment, other feeding stations 10 may be added and communicatively linked to each other as a means for having a feeding regimen for one or more animals. Such a configuration is especially desirable when feeding is required for extended time periods when an animal owner is not available, or simply out of the sheer convenience of not having to refill the hopper 16 repeatedly.

In another exemplary embodiment, feeding station 10 may include a plurality of supply hoppers 16a to 16n filled with different, or like, food products 17, and associated plurality of troughs 62a to 62n each associated dispensing mechanisms 63 under control of microprocessor 34. Accordingly, a single program may include instructions for execution by microprocessor 34 to control individual dispensing mechanisms 63, in accordance with a desired feeding regimen.

In yet another exemplary embodiment, an accelerometer and/or gyroscope are associated with RFID tag 58 to acquire data related to the activity of animal 11, and such data is correlated to the feeding program of animal 11 and is used to adjust the feeding regimen or diet of animal 11 and to track the overall health of animal 11.

In yet another exemplary embodiment, feeding station 10 comprises input/output (I/O) devices, such as a microphone, speaker, and image capture device to permit visualization of a feeding animal 11 and communication with animal 11 while feeding to reduce stress caused by separation anxiety. Alternatively, recorded user messages may be played via the speaker. The display may be a touch screen for receiving inputs from a user, and a speech recognition unit may also receive inputs from the user.

In yet another exemplary embodiment, using the application on user device 49 a user may override existing feeding programmed instructions, and may select to dispense a particular amount of food product 17 at a particular time.

In yet another exemplary embodiment, animal 11 is associated with an active RFID tag 58 or transmitter that broadcasts the encoded unique identifier periodically.

In yet another exemplary embodiment, animal 11 is associated with a semi-active RFID tag 58 or a semi-passive RFID tag 58.

In yet another exemplary embodiment, tunnel 20 comprises baffles 25 or scallops integrally formed with base 15, which substantially minimize the possibility of more than one animal 11 entering the tunnel 20 simultaneously, and eating the same meal; while also discouraging cats 11 from sleeping in tunnel 20.

In yet another exemplary embodiment, lid 23 comprises shark fin members 27 associated with upper portion 12, such as lid 23, to further discourage animals 11 from resting on top of the enclosure.

In yet another exemplary embodiment, parts of feeding station 10 that come into contact with food product 17 are removably attached to feeding station 10 for maintenance or cleaning, such as by a manual cleaning process, an automated washing process or by a dishwasher. As an example, food dispensing unit 24, supply hoppers 16a, 16b, gate control 65a, 65b, troughs 62a, 62b, augers 90a, 90b, weigh hopper 64, chute 26, hemi-circular disc-shaped feeding platform 28, and hemi-frustoconical sweeping member 140, 300, divider 322, disposal bins 112, 114, may be removed for cleaning or maintenance, and can be subsequently introduced into feeding station 10. For example, these removably attachable parts may include a magnetic assembly for coupling to, and decoupling from, another magnetic assembly on feeding station 10. Alternatively, other suitable fastening means such as screws, nuts and bolts, are employed.

One of ordinary skill in the art will appreciate that the electronics involved in the operation of this system may take a variety of embodiments. User interface 52 may include button actuators of the capacitive or piezoelectric sensor type, for sending electrical selection signals to microprocessor 34. The button actuators can be disposed on user interface 52. Liquid crystal display (LCD) driver circuitry for receiving predetermined display data from microprocessor 34 drives an LCD display with alphanumeric characters for providing user feedback. Of course, any other suitable type of display can be used. Microprocessor 34 can be programmable to permit the manufacturer to install pre-set control algorithms and auger control data for all valid selection combinations. Microprocessor 34 receives the electrical selection signals from the user interface 52 for accessing the programmed auger calibration data and calculating the necessary volume to dispense. Once calculated, microprocessor 34 executes a control algorithm and issues corresponding auger control data also referred to as a driving signal, which can include the specific auger motor unit 94a or 94b to be actuated and the quantity of food to be dispensed from its corresponding dispensing mechanism 63. The dispensed food may include any one of: feed, kibble, grub, goodies, food granules, and fodder.

The programmability of microprocessor 34 also permits tracking of remaining food product 17 in troughs 62a, 62b. Since the volume of each dispense, and the full level volume of supply hoppers 16a, 16b, is known, microprocessor 34 can determine the remaining volume of food product 17 in real-time, such that a visual and/or audio alert is emitted once a predetermined empty level threshold is reached. Of course, a low level indication can be provided when the remaining volume of food product 17 has reached a predetermined level. This alert can signal the user to refill supply hoppers 16a, 16b.

Although the description above is focussed on dispensing food products 17, feeding station 10 may also be configured to dispense fluids, such as water, in accordance with an animal-specific feeding regimen, and track consumption thereof, in accordance with the methods and systems described above.

Although the description above is focussed on a hemi-circular feeding platform sweeping member, it should be noted that it may be formed of other shapes, such as, but not limited to a circle, rectangle, triangle, pentagon, hexagon, octagon, heptagon, decagon, among others.

In yet another exemplary embodiment, feeding station 10 comprises a connection to a water main to provide fresh, clean water at all times, especially when animal 11 is left alone for extended periods, or simply for convenience. Accordingly, a water bowl is provided with sensors to automatically sense the water level and the microprocessor 34 controls a water main solenoid valve to open as needed.

Although the description above discloses a cat as an exemplary animal 11, it should be appreciated that animal 11 may be any member of the animal species.

Computing devices 49 include a general-purpose computer system comprising, for example, a processing unit, such as processor, system memory. The system also comprises as input/output (I/O) devices coupled to the processor via an I/O controller. The input/output (I/O) devices include, for example, a keyboard, mouse, trackball, microphone, touch screen, a printing device, display screen, speaker, etc. A communications interface device provides networking capabilities using Wi-Fi, and/or other suitable network format, to enable connection to shared or remote drives, one or more networked computers, or other networked devices, via the communications network 51. The components of computer system may be coupled by an interconnection mechanism, which may include one or more buses (e.g., between components that are integrated within a same machine) and/or a network (e.g., between components that reside on separate discrete machines). The interconnection mechanism enables communications (e.g., data, instructions) to be exchanged between system components.

The processor executes sequences of instructions contained in memory, such as a machine readable medium. The machine readable medium includes any mechanism that provides (i.e., stores and/or transmits) information in a form accessible by a machine (e.g., a computer, network device, personal digital assistant, a smartphone, any device with a set of one or more processors, etc.). For example, machine readable media includes recordable/non-recordable media (e.g., read only memory (ROM); random access memory (RAM); magnetic disk storage media; optical storage media; flash memory devices; a hard disk drive, etc.), as well as electrical, optical, acoustical or other forms of propagated signals (e.g., carrier waves, infrared signals, digital signals, etc.). The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used. The operating system may be, for example, iPhone OS (e.g. iOS), Windows Mobile, Google Android, Symbian, or the like.

Server computer 50 may be a web server (or a series of servers) running a network operating system, examples of which may include but are not limited to: Microsoft® Windows® XP Server; Novell® Netware®; or Red Hat® Linux®, for example (Microsoft and Windows are registered trademarks of Microsoft Corporation in the United States, other countries, or both; Novell and NetWare are registered trademarks of Novell Corporation in the United States, other countries, or both; Red Hat is a registered trademark of Red Hat Corporation in the United States, other countries, or both; and Linux is a registered trademark of Linus Torvalds in the United States, other countries, or both).

Server computer 50 may execute a web server application, examples of which may include but are not limited to: Microsoft IIS, Novell Webserver™, or Apache® Webserver, that allows for HTTP (i.e., HyperText Transfer Protocol) access to server computer via network 51 (Webserver is a trademark of Novell Corporation in the United States, other countries, or both; and Apache is a registered trademark of Apache Software Foundation in the United States, other countries, or both). Network 51 may be connected to one or more secondary networks (e.g., network CC), examples of which may include but are not limited to: a local area network; a wide area network; or an intranet, for example.

Database 53 may be, include or interface to, for example, the Oracle™ relational database sold commercially by Oracle Corp. Other databases, such as Informix™, DB2 (Database 2), Sybase or other data storage or query formats, platforms or resources such as OLAP (On Line Analytical Processing), SQL (Standard Query Language), a storage area network (SAN), Microsoft Access™ or others may also be used, incorporated or accessed in the invention. Alternatively, database 53 is communicatively coupled to server computer 50.

The feeding station 10, user devices 49 and computer server 50 may communicate with each other using network-enabled code. Network enabled code may be, include or interface to, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMWL), Wireless Markup Language (WML), Java™, Java™ Beans, Enterprise Java™ Beans, Jini™, C, C++, Perl, UNIX Shell, Visual Basic or Visual Basic Script, Virtual Reality Markup Language (VRML), ColdFusion™ or other compilers, assemblers, interpreters or other computer languages or platforms.

The communications network 51 can include a series of network nodes (e.g., the clients and servers) that can be interconnected by network devices and wired and/or wireless communication lines (such as, public carrier lines, private lines, satellite lines, etc.) that enable the network nodes to communicate. The transfer of data between network nodes can be facilitated by network devices, such as routers, switches, multiplexers, bridges, gateways, etc., that can manipulate and/or route data from an originating node to a server node regardless of dissimilarities in the network topology (such as, bus, star, token ring, mesh, or hybrids thereof), spatial distance (such as, LAN, MAN, WAN, Internet), transmission technology (such as, TCP/IP, Systems Network Architecture), data type (such as, data, voice, video, multimedia), nature of connection (such as, switched, non-switched, dial-up, dedicated, or virtual), and/or physical link (such as, optical fiber, coaxial cable, twisted pair, wireless, etc.) between the correspondents within the network.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises," "comprising," or any other variations thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

The preceding detailed description of exemplary embodiments of the invention makes reference to the accompanying drawings, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. For example, the steps recited in any of the method or process claims may be executed in any order and are not limited to the order presented. Further, the present invention may be practiced using one or more servers, as necessary. Thus, the preceding detailed description is presented for purposes of illustration only and not of limitation, and the scope of the invention is defined by the preceding description, and with respect to the attached claims.

The invention claimed is:

1. A feeding station for at least one animal, said feeding station comprising:
   an enclosure having a base, said enclosure comprising:
   a first supply hopper having a first food product;
   a second supply hopper having a second food product;
   a portal to said enclosure for allowing access to said first food product and said second food product by said at least one animal for a feeding event;
   a first food dispensing unit having means for dispensing controlled portions of said first food product;
   a second food dispensing unit having means for dispensing controlled portions of said second food product;

a weigh hopper having a first section for receiving said first food product from said first food dispensing unit; and a second section for receiving said second food product from said second food dispensing unit;

a feeding platform within said enclosure for receiving said food product from said weigh hopper, and a feeding platform sweeping member comprising a first compartment to receive said first food product and a second compartment to receive said second food product; and whereby feeding platform sweeping member is caused to clear unconsumed said first food product and unconsumed second food product off said feeding platform;

a first disposal bin for receiving said unconsumed first food product from said feeding platform, and a second disposal bin for receiving said unconsumed second food product from said feeding platform following said feeding event; and at least one hopper weight sensor for determining the weight of said first food product in said first section of said weigh hopper before said feeding event, and the weight of said second food product in said second section of said weigh hopper before said feeding event, and at least one bin weight sensor for determining the weight of said first food product in said first disposal bin and the weight of said second food product in said second disposal bin following said feeding event.

2. The feeding station of claim 1, wherein said first food dispensing unit comprises a first trough to receive said first food product from said first supply hopper at one end of said first trough, and an auger member received in said first trough, said auger member operable by an auger motor to rotate and advance said first food product to an exit port at another end of said first trough; and wherein said second food dispensing unit comprises a second trough to receive said second food product from said second supply hopper at one end of said second trough, and an auger member received in said second trough, said auger member operable by an auger motor to rotate and advance said second food product to an exit port at another end of said second trough.

3. The feeding station of claim 2, wherein said auger member comprises a continuous flight having a progressive pitch between flight blades to dispense said controlled portions of said first food product or said second food product.

4. The feeding station of claim 1, wherein said enclosure comprises an egg-shaped top portion having an angle of curvature sufficient to cause said at least one animal to slide off should it attempt to rest on said feeding station; and at least one shark fin member associated with said egg-shaped top portion to deter said at least one animal from resting thereon.

5. The feeding station of claim 3, wherein the amount of said first food product or said second food product contained between said flight blades is determined, and each increment of a revolution of said auger member dispenses a predetermined amount of said first food product or said second food product via said exit port of said first trough or via said exit port of second trough.

6. The feeding station of claim 5, wherein said base extends along a first longitudinal axis, and said trough and said auger member are disposed above said base, and along a second longitudinal axis oblique to first longitudinal axis at a predetermined angle.

7. The feeding station of claim 6, wherein said predetermined angle results in said first food product or second food product being received primarily at said other end, and said predetermined angle minimizes reduce an initial burst of said first food product or said second food product as dispensation begins, and results in improved control of progressive dispensation of said first food product or said second food product.

8. The feeding station of claim 7, further comprising:
a food dispensing module for providing control signals to said auger motor;
a weight sensor module for receiving and processing signals from said at least one hopper weight sensor;
a communication interface module;
an animal sensing module positioned adjacent to said portal detects the presence of said at least one animal; wherein
said at least one animal is associated with an identification tag encoded with a unique identifier, and animal sensing module acquires said unique identifier information.

9. The feeding station of claim 8, wherein said identification tag comprises a radio frequency identification (RFID) tag and said animal sensing module comprises an RFID tag reader assembly.

10. The feeding station of claim 8, further comprising a control system, wherein said food dispensing module, said animal sensing module, said weight sensor module and said communication interface module are controlled by said control system; wherein said control system comprises processing circuitry and a computer readable medium comprising at least one feeding program for said at least one animal, and said at least one feeding program comprising executable instructions by said processing circuitry.

11. The feeding station of claim 10, wherein said computer readable medium comprises a database having a plurality of profiles for each of said at least one animal, each of said animal profiles comprising at least one of said unique identifier, dietary needs, feeding schedule to form said at least one feeding program.

12. The feeding station of claim 10, further comprising a user interface for entering said at least one feeding program, and tracking said feeding events, weight of dispensed said first food product or said second food product, weight of disposed said first food product or said second food product, weight of consumed said first food product or said second food product.

13. The feeding station of claim 12, wherein said communication interface module is in communication with an external computing device configured to enter said at least one feeding program, and track said feeding events, weight of dispensed weight of dispensed said first food product or said second food product, weight of disposed said first food product or said second food product, weight of consumed said first food product or said second food product.

14. The feeding station of claim 13, wherein said control system retrieves said animal profile associated with said unique identifier, and said control system issues control signals to said food dispensing module to enable rotation of said auger motor to dispense a predetermined amount of said first food product or said second food product from said trough into said weigh hopper in accordance with said feeding program for said at least one animal; and said weigh sensor module sends a pre-feeding event weight measurement of said first food product or said second food product to said control system and stores said pre-feeding event weight measurement in said database, and said weigh sensor module sends a post-feeding event weight measurement of said first food product or said second food product in said at least one disposal bin following said feeding event to said control system and stores said post-feeding event weight measurement in said database; and said control system thereby determines the amount of said first food product or said second food product that was consumed.

15. The feeding station of claim 14, wherein said weigh hopper comprises a couple of jawed portions with a baffle therebetween such that one jawed portion receives said first food product from said first food dispensing unit, and another jawed portion receives said second food product from said second food dispensing unit, and wherein said jawed portions are pivotably connected to each other and operable between a closed position and an open position, and wherein a solenoid assembly is associated with one of said jawed portions, and said solenoid assembly receives a solenoid signal from said food dispensing module to open said jawed portions to release said first food product or said second food product, and to close said jawed portions to receive said first food product or said second food product in said weigh hopper.

16. A feeding station for at least one animal, said feeding station comprising:
an enclosure having a base, said enclosure comprising:
at least one supply hopper having a food product;
a food dispensing unit having means for dispensing controlled portions of said food product;
a weigh hopper for receiving said food product from said food dispensing unit;
a feeding platform within said enclosure for receiving said food product from said weigh hopper;
a portal to said enclosure for allowing access to said food product by said at least one animal for a feeding event;
a sweeping member rotatable on a top surface of said feeding platform, and disposed on said feeding platform before said food product is released from said weigh hopper prior to said feeding event; and wherein said sweeping member comprises at least one compartment to contain said food product;
and said sweeping member rotatable to remove unconsumed food product off said feeding platform after said feeding event;
at least one disposal bin for receiving said unconsumed food product from said feeding platform following said feeding event; and
at least one hopper weight sensor for determining the weight of said food product in said weigh hopper before said feeding event, and at least one bin weight sensor for determining the weight of said food product in said at least one disposal bin following said feeding event.

17. The feeding station of claim 16, wherein said weigh hopper and said at least one disposal bin are disposed on a weighing platform associated with said at least one bin weight sensor.

18. The feeding station of claim 17, further comprising a processor for executing instructions in a computer readable medium to provide control signals to said food dispensing unit to dispense said controlled portions of said food product and receive and process weight measurements from said at least one bin weight sensor and said at least one hopper weight sensor.

19. The feeding station of claim 18, wherein said at least one animal is associated with an identification tag having a unique identifier; wherein said computer readable medium comprises at least one set of programmed feeding instructions associated with said unique identifier for dispensing said controlled portions of said food product to said at least one uniquely-identified animal, said one set of programmed feeding instructions are based on specific dietary needs of said at least one uniquely-identified animal.

20. The feeding station of claim 19, wherein said processor comprises executable instructions to determine the amount of at least one food product consumed by said at least one uniquely-identified animal based on said weight measurements of said at least one food product before said feeding event and after said feeding event.

21. The feeding station of claim 20, further comprising a user interface unit coupled to said processor, wherein said user interface unit facilitates input of said one set of programmed feeding instructions and display of said feeding habits; and further comprising a communication interface unit coupled to said processor, wherein said communication interface unit facilitates with an external device for input of said one set of programmed feeding instructions and display of said feeding habits.

22. The feeding station of claim 21, wherein said food dispensing unit comprises a trough to receive said food product from said at least one supply hopper at one end of said trough, and an auger member received in said trough, said auger member operable by an auger motor to rotate and advance said food product to a trough exit port at another end of said trough into said weigh hopper; and wherein said auger member comprises a continuous flight having a progressive pitch between flight blades to dispense said controlled portions of said food product.

23. The feeding station of claim 20, wherein said determine the feeding habits of said at least one uniquely-identified animal including at least one of: type of said at least one animal; age and weight of said at least one animal; type and amount of food consumed, and rate and frequency of consumption; time of day of feeding events, and duration of feeding events.

24. The feeding station of claim 22, wherein at least one of: said sweeping member, said hemi-circular disc-shaped feeding platform, said at least one disposal bin, said at least one supply hopper; said food dispensing unit and said weigh hopper, is removably attached to said enclosure.

* * * * *